(12) United States Patent
Luo

(10) Patent No.: US 12,222,978 B2
(45) Date of Patent: Feb. 11, 2025

(54) IMAGE DISPLAY METHOD AND ELECTRONIC DEVICE

(71) Applicant: Huawei Technologies Co., Ltd., Shenzhen (CN)

(72) Inventor: Qian Luo, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/626,701

(22) PCT Filed: Jul. 20, 2020

(86) PCT No.: PCT/CN2020/103115
§ 371 (c)(1),
(2) Date: Jan. 12, 2022

(87) PCT Pub. No.: WO2021/017932
PCT Pub. Date: Feb. 4, 2021

(65) Prior Publication Data
US 2022/0269720 A1    Aug. 25, 2022

(30) Foreign Application Priority Data
Jul. 26, 2019    (CN) .......................... 201910683677.2

(51) Int. Cl.
*G06F 3/0484*    (2022.01)
*G06F 3/04817*   (2022.01)
(Continued)

(52) U.S. Cl.
CPC .......... *G06F 16/55* (2019.01); *G06F 3/04817* (2013.01); *G06F 3/04842* (2013.01);
(Continued)

(58) Field of Classification Search
CPC .. G06F 16/55; G06F 3/04817; G06F 3/04842; G06F 16/583; G06F 3/0482; G06F 3/0484; H04N 1/00395; H04N 1/00453
See application file for complete search history.

(56) References Cited

U.S. PATENT DOCUMENTS 7,890,858 B1 * 2/2011 Graham .............. G06F 16/9577
                                                    715/253
8,438,495 B1 * 5/2013 Gilra ..................... G06F 3/0481
                                                    345/173
(Continued)

FOREIGN PATENT DOCUMENTS

CN    103558996 A    2/2014
CN    104834687 A    8/2015
(Continued)

Primary Examiner — Phenuel S Salomon
(74) Attorney, Agent, or Firm — Conley Rose, P.C.

(57) ABSTRACT

An image display method applied to fields, including artificial intelligence (AI) and human computer interaction, includes detecting an input operation; displaying an image selection interface on a display in response to the input operation; determining at least one image related to the input operation from a group of associated images in a local memory or a cloud storage; displaying a thumbnail of the at least one image in the image selection interface; hiding another image; detecting a first operation where the first operation selects a first thumbnail in the image selection interface; and performing, on the first thumbnail, a processing procedure corresponding to the input operation.

20 Claims, 34 Drawing Sheets

(51) Int. Cl.
   *G06F 3/04842*   (2022.01)
   *G06F 16/55*     (2019.01)
   *G06F 16/583*    (2019.01)
   *H04N 1/00*      (2006.01)

(52) U.S. Cl.
   CPC ....... *G06F 16/583* (2019.01); *H04N 1/00395* (2013.01); *H04N 1/00453* (2013.01)

(56) References Cited

U.S. PATENT DOCUMENTS

| | | | | |
|---|---|---|---|---|
| 8,996,625 | B1* | 3/2015 | Singleton | H04L 9/40 |
| | | | | 707/771 |
| 9,591,050 | B1* | 3/2017 | Sherrets | H04N 21/4826 |
| 10,140,553 | B1 | 11/2018 | Vasisht et al. | |
| 2008/0032739 | A1* | 2/2008 | Hoodbhoy | G06Q 30/02 |
| | | | | 455/556.2 |
| 2011/0093520 | A1* | 4/2011 | Doyle | G06F 16/9535 |
| | | | | 709/224 |
| 2011/0243452 | A1 | 10/2011 | Sakaguchi et al. | |
| 2011/0296326 | A1* | 12/2011 | Reid | G06T 11/00 |
| | | | | 715/764 |
| 2012/0324002 | A1* | 12/2012 | Chen | G06F 16/51 |
| | | | | 709/204 |
| 2013/0272610 | A1* | 10/2013 | Ogishi | G06V 30/413 |
| | | | | 382/175 |
| 2013/0332512 | A1* | 12/2013 | Roman | G06F 16/176 |
| | | | | 709/203 |
| 2017/0163840 | A1* | 6/2017 | Ito | H04N 5/765 |
| 2018/0336415 | A1* | 11/2018 | Anorga | G06N 20/00 |
| 2019/0095067 | A1 | 3/2019 | Huang et al. | |
| 2019/0163346 | A1* | 5/2019 | Tomono | G06F 3/0485 |
| 2021/0011940 | A1 | 1/2021 | Tang et al. | |
| 2021/0150243 | A1* | 5/2021 | Wang | G06F 3/0488 |

FOREIGN PATENT DOCUMENTS

| | | | | |
|---|---|---|---|---|
| CN | 106095805 | A | 11/2016 | |
| CN | 107153708 | * | 9/2017 | ............ G06F 17/30 |
| CN | 107153708 | A | 9/2017 | |
| CN | 107341190 | A | 11/2017 | |
| CN | 104834699 | B | 12/2017 | |
| CN | 107977463 | A | 5/2018 | |
| CN | 108197220 | A | 6/2018 | |
| CN | 108460065 | A | 8/2018 | |
| CN | 108874900 | A | 11/2018 | |
| CN | 109325137 | A | 2/2019 | |
| CN | 110543579 | A | 12/2019 | |
| JP | 2005039486 | * | 2/2005 | ............... H04N 5/85 |
| WO | 2019109245 | A1 | 6/2019 | |

\* cited by examiner

| A mobile phone 100 detects operation behaviors on images, where the operation behavior includes a behavior such as deleting, viewing, sharing, collecting, or editing the image | ～ S601 |

↓

| The mobile phone 100 classifies the images into images of "you like" and images of "you dislike" based on the operation behaviors | ～ S602 |

Excessively bright   Excessively bright   Retain

IMAGE DISPLAY METHOD AND ELECTRONIC DEVICE

CROSS-REFERENCE TO RELATED APPLICATIONS

This is a U.S. National Stage of International Patent Application No. PCT/CN2020/103115 filed on Jul. 20, 2020, which claims priority to Chinese Patent Application No. 201910683677.2 filed on Jul. 26, 2019. Both of the aforementioned applications are hereby incorporated by reference in their entireties.

TECHNICAL FIELD

This application relates to the field of terminal technologies, and in particular, to an image display method and an electronic device.

BACKGROUND

With progress of terminal technologies, functions of electronic devices are gradually improved. Taking a mobile phone as an example, an image photographing function is one of functions frequently used by users. Therefore, a large quantity of images may be stored in the mobile phone.

However, if a user wants to perform an operation (for example, sharing or deleting) on an image, the user needs to manually search a large quantity of images for the image. Operations are cumbersome, and user experience is relatively poor.

SUMMARY

This application provides an image display method and an electronic device, and the method can help a user quickly locate a target image, so that user operations are simple.

According to a first aspect, an embodiment of this application provides an image display method. The method may be performed by an electronic device. The method includes: detecting an input operation; displaying an image selection interface on a display in response to the input operation; determining at least one image related to the input operation from a group of associated images in a local memory or a cloud storage; displaying a thumbnail of the at least one image in the image selection interface, and hiding another image; detecting a first operation for selecting a first thumbnail in the image selection interface; and performing, on the first thumbnail, a processing procedure corresponding to the input operation.

In some embodiments, the electronic device may determine the at least one image associated with the input operation from the group of images based on the input operation. After detecting that a user selects a target image from the at least one image, the electronic device may perform, on the target image, the processing procedure corresponding to the input operation. According to the method, the electronic device may select images meeting a condition (related to the input operation) from a large quantity of images, and then the user may search, for the target image, the images selected by the electronic device, so that user operations are simple, and user experience is improved.

In a possible design, the hiding another image includes: hiding an image other than the at least one image in the group of images.

In some embodiments, the electronic device may determine the at least one image associated with the input operation from the group of images based on the input operation. When displaying the at least one image, the electronic device may hide the another image in the group of images, to help the user have a view, help the user quickly locate a target image, and facilitate user operations.

In a possible design, the electronic device may further display marking information. The marking information is used to indicate that the at least one image is related to the input operation.

In some embodiments, the electronic device may display the marking information, to help the user quickly locate a target image and facilitate user operations.

In a possible design, the displaying marking information includes: displaying the marking information on a thumbnail of each of the at least one image; or displaying the marking information in a region in which the at least one image is not displayed in the image selection interface.

It should be understood that the electronic device may display the marking information in any form, provided that the marking information can indicate that the at least one image is related to the input operation. This is not limited in this embodiment of this application.

In a possible design, the marking information includes one or more of an icon, a text, and an image; or the displaying the marking information on a thumbnail of each of the at least one image includes: highlighting an edge of the thumbnail of each of the at least one image.

It should be understood that the foregoing only lists several examples of identification information, and does not constitute a limitation.

In a possible design, the group of associated images include a group of images including a same photographed object, and/or a group of images whose photographing time difference is less than a preset time difference, and/or a group of images photographed at a same place, and/or a group of images belonging to a same album, and/or a group of images including same content but having different resolution, and/or a group of images obtained after a same image is retouched in different manners.

It should be understood that the foregoing descriptions of a group of images are only an example, and do not constitute a limitation.

In a possible design, before detecting the input operation, the electronic device may further preset an associated image of each type of input operation.

In some embodiments, the electronic device may preset the associated image of each type of input operation. In this way, after detecting the input operation, the electronic device may determine the at least one image corresponding to the input operation. According to the method, the user does not need to search a large quantity of images for a target image, so that user operations are simple, and user experience is improved.

In a possible design, the input operation is an operation used to publish an image, and the performing, on the first thumbnail, a processing procedure corresponding to the input operation includes: performing an image publishing procedure on an image corresponding to the first thumbnail; or the input operation is an operation used to send an image to a contact, and the performing, on the first thumbnail, a processing procedure corresponding to the input operation includes: sending an image corresponding to the first thumbnail to the contact.

In some embodiments, when detecting an operation used to publish an image, the electronic device displays a thumbnail of at least one image related to the publishing operation. After detecting an operation of displaying a first thumbnail from the thumbnail of the at least one image by the user, the electronic device may perform a publishing procedure on an image corresponding to the first thumbnail. Alternatively, when detecting an operation used to send an image to a contact, the electronic device displays a thumbnail of at least one image related to the operation. After detecting an operation of displaying a first thumbnail from the thumbnail of the at least one image by the user, the electronic device may send an image corresponding to the first thumbnail to a contact. According to the method, the electronic device may select, based on an input operation, images related to the input operation, in other words, the electronic device may select, from a large quantity of images, images meeting a condition to some extent (related to the input operation), and then the user may select a target image from the images selected by the electronic device, so that user operations are simple, and user experience is improved.

In a possible design, the determining at least one image related to the input operation from a group of associated images in a local memory or a cloud storage includes: determining an operation type of the input operation; and determining, based on the operation type, at least one image associated with the operation type.

For example, when the operation type of the input operation is image publishing, the electronic device determines an image suitable to be published. For another example, when the operation type of the input operation is sharing an image with a contact, the electronic device determines an image suitable to be shared with a contact.

In a possible design, the determining an operation type of the input operation includes: determining that the input operation is an operation used to publish an image; and the determining, based on the operation type, at least one image associated with the operation type includes: determining, based on the operation type, at least one image suitable to be published.

In some embodiments, the electronic device may determine, from a relatively large quantity of images, at least one image suitable to be published, and the user does not need to search a large quantity of images for a target image, so that user operations are simple, and user experience is improved.

In a possible design, the determining an operation type of the input operation includes: determining that the input operation is an operation of communicating with another contact; and the determining, based on the operation type, at least one image associated with the operation type includes: determining, based on the operation type, at least one image suitable to be sent to the another contact.

In some embodiments, the electronic device may determine, from a relatively large quantity of images, at least one image suitable to be shared with a contact, and the user does not need to search a large quantity of images for a target image, so that user operations are simple, and user experience is improved.

In a possible design, the at least one image suitable to be published includes an image of a same type as an image that has been published and/or at least one image that has been retouched for a preset quantity of times.

It should be understood that the foregoing is only an example of an image suitable to be published, and does not constitute a limitation. In an actual application, the electronic device may determine, in another manner, images suitable to be published.

In a possible design, the at least one image suitable to be sent to the another contact includes an image including the another contact and/or an image of a same type as an image that has been sent to the another contact.

It should be understood that the foregoing is only an example of an image suitable to be published, and does not constitute a limitation. In an actual application, the electronic device may determine, in another manner, images suitable to be shared with a contact.

In a possible design, the determining at least one image related to the input operation from a group of associated images in a local memory or a cloud storage includes: determining related information of an application to which the input operation relates; and determining, based on the related information of the application, at least one image associated with the related information of the application.

In some embodiments, the electronic device may determine, based on the related information of the application, the at least one image associated with the related information of the application. According to the method, the user does not need to search a large quantity of images for a target image, so that user operations are simple, and user experience is improved.

In a possible design, the determining related information of an application to which the input operation relates includes: determining a type or a function of the application to which the input operation relates; and the determining, based on the related information of the application, at least one image associated with the related information of the application includes: determining, based on the type or the function of the application, at least one image matching the type or the function.

In some embodiments, the electronic device may determine the at least one image based on the type or the function of the application. According to the method, the user does not need to search a large quantity of images for a target image, so that user operations are simple, and user experience is improved.

In a possible design, the determining related information of an application to which the input operation relates includes: determining a historical record of publishing or sharing an image by the application to which the input operation relates; and the determining, based on the related information of the application, at least one image associated with the related information of the application includes: determining, based on the historical record of the application, at least one image matching the historical record.

In some embodiments, the electronic device may determine the at least one image based on the historical record of the application. According to the method, the user does not need to search a large quantity of images for a target image, so that user operations are simple, and user experience is improved.

In a possible design, the determining at least one image related to the input operation from a group of associated images in a local memory or a cloud storage includes: determining time information corresponding to the input operation; and determining, based on the time information, at least one image matching the time information.

In some embodiments, the electronic device may determine the at least one image based on the time information of the input operation. According to the method, the user does not need to search a large quantity of images for a target image, so that user operations are simple, and user experience is improved.

In a possible design, the determining at least one image related to the input operation from a group of associated images in a local memory or a cloud storage includes: reading or loading all images in the group of associated images from the local memory or the cloud storage; and determining the at least one image related to the input operation from all the images in the group of images; and the displaying a thumbnail of the at least one image in the image selection interface, and hiding another image includes: displaying the thumbnail of the at least one image in the image selection interface, and not displaying a thumbnail of the another image in the image selection interface.

In some embodiments, an electronic device may read all the images in the group of images from the local memory or the cloud storage, and then select the at least one image from all the read images. The electronic device may display only the thumbnail of the at least one selected image in the image selection interface, and not display the thumbnail of the another image, for example, may discard the another image.

In a possible design, the displaying a thumbnail of the at least one image in the image selection interface, and hiding another image includes: reading or loading the at least one image from the local memory or the cloud storage, and displaying the thumbnail of the at least one image in the image selection interface; and not reading or loading the image other than the at least one image in the group of images from the local memory or the cloud storage.

In some embodiments, the electronic device may read only the at least one image related to the input operation from the local memory or the cloud storage, and not read the another image. Therefore, the electronic device may display only the thumbnail of the at least one read image in the image selection interface, and not display the thumbnail of the another image.

In a possible design, the displaying a thumbnail of the at least one image in the image selection interface, and hiding another image includes: preloading the thumbnail of the at least one image from the local memory or the cloud storage, and not preloading a thumbnail of the image other than the at least one image in the group of images; and displaying the thumbnail of the at least one image in the image selection interface.

In some embodiments, the electronic device may not fully load any image, but preload the thumbnail of the at least one image related to the input operation without preloading the thumbnail of the another image. Therefore, the electronic device may display only the thumbnail of the at least one preloaded image in the image selection interface, and not display the thumbnail of the another image.

According to a second aspect, an embodiment of this application further provides an electronic device. The electronic device includes a display, at least one processor, and a memory. The memory is configured to store one or more computer programs, and when the one or more computer programs stored in the memory are executed by the at least one processor, the electronic device can implement the technical solution according to any one of the first aspect and the possible designs of the first aspect.

According to a third aspect, an embodiment of this application further provides an electronic device. The electronic device includes modules/units that perform the method according to any one of the first aspect and the possible designs of the first aspect. These modules/units may be implemented by hardware, or may be implemented by hardware by executing corresponding software.

According to a fourth aspect, an embodiment of this application further provides a chip. The chip is coupled to a memory in an electronic device, and is configured to invoke a computer program stored in the memory and execute the technical solution according to any one of the first aspect and the possible designs of the first aspect in embodiments of this application. In this embodiment of this application, "coupling" means that two components are directly or indirectly combined with each other.

According to a fifth aspect, an embodiment of this application further provides a computer-readable storage medium. The computer-readable storage medium includes a computer program. When the computer program is run on an electronic device, the electronic device is enabled to perform the technical solution in any one of the first aspect of the embodiments of this application or the possible designs of the first aspect.

According to a sixth aspect, an embodiment of this application provides a program product, including instructions. When the program product is run on an electronic device, the electronic device is enabled to perform the technical solution in any one of the first aspect of the embodiments of this application or the possible designs of the first aspect.

DESCRIPTION OF EMBODIMENTS

Figure 1A:
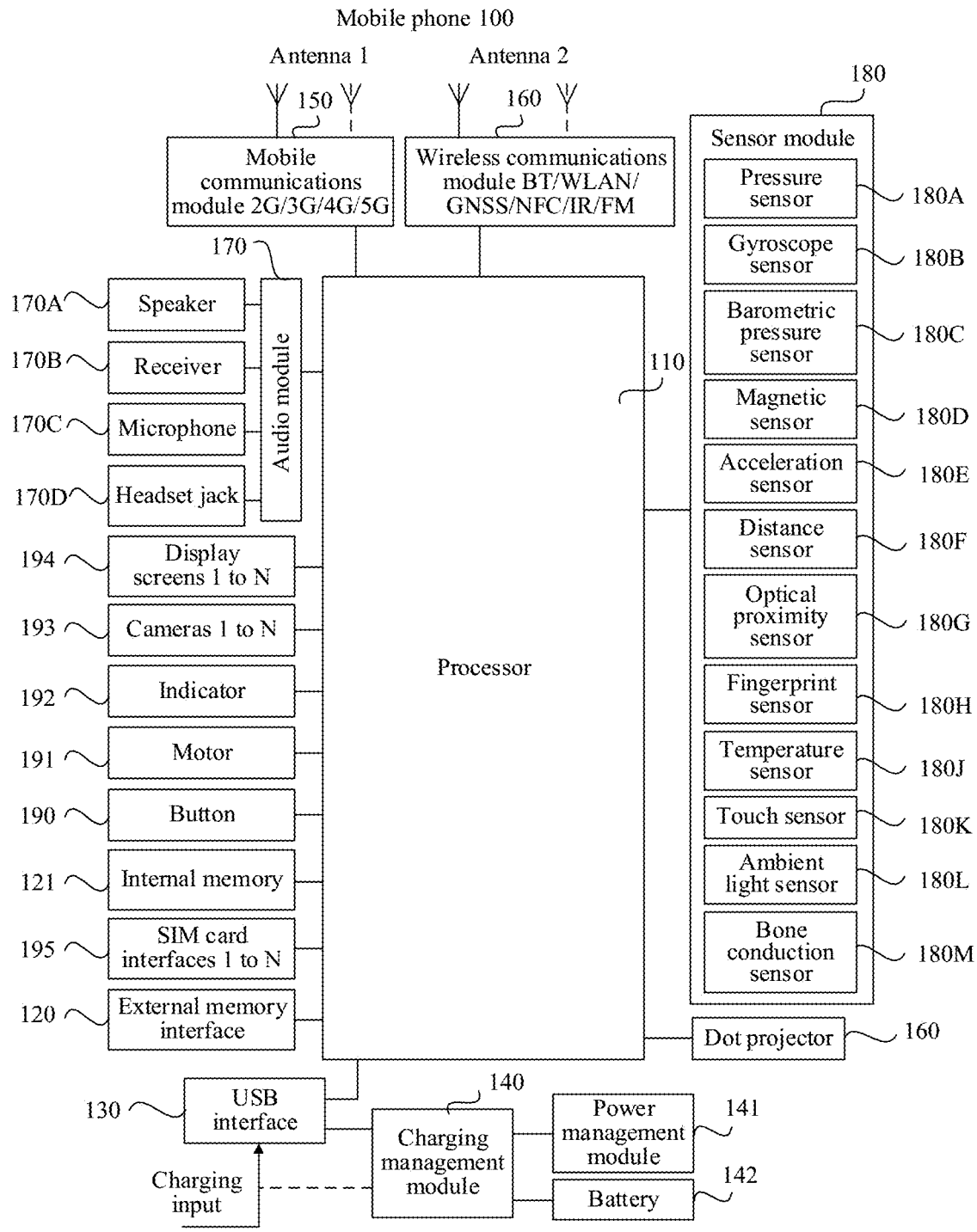
FIG. 1A is a schematic diagram of a hardware structure of a mobile phone 100 according to an embodiment of this application.

The following clearly and completely describes the technical solutions in the embodiments of this application with reference to the accompanying drawings in the embodiments of this application. Apparently, the described embodiments are merely some but not all of the embodiments of this application. All other embodiments obtained by persons of ordinary skill in the art based on the embodiments of this application without creative efforts shall fall within the protection scope of this application.

In the following, some terms of the embodiments of this application are described, to help persons skilled in the art have a better understanding.

An application (application, app for short) in this embodiment of this application is a software program that can implement one or more specific functions. Generally, a plurality of applications can be installed on a terminal, such as a camera application, a gallery application, a short message application, a multimedia message application, various email applications, WeChat (WeChat), a Tencent chat software (QQ), WhatsApp Messenger, Line (Line), Instagram (instagram), Kakao Talk, and DingTalk. The application mentioned in the following may be an application installed when the terminal is delivered from a factory, or may be an application downloaded by a user from a network or obtained by the user from another terminal in a process of using the terminal.

A social application (or referred to as a social platform) in the embodiments of this application is an application that can implement content (for example, an image or a text) sharing. For example, the social application is Facebook (facebook), Twitter (twitter), Weibo, WeChat, Instagram, Zhihu, Linkedin, Douban, Tianya, and Xiaohongshu.

An image selection interface (which may also be referred to as an interface for selecting an image) in the embodiments of this application is an interface that can display thumbnails of a plurality of images for selection by a user, for example, an interface 203 in FIG. 2B (a) to FIG. 2B (d) or an interface 305 in FIG. 3B (a) to FIG. 3B (e) below.

A thumbnail in the embodiments of this application is an incomplete image that is of an image and that is made for ease of browsing of a user or for displaying more images. The incomplete image may be an image obtained by compressing an image, or an image obtained by reducing a size of an image, or an image obtained by sampling some pixels on an image, or an image that displays only a part of content of an image, or an image stored on the cloud, where a blurred outline of the image can be locally displayed (an image that has not been downloaded from the cloud). For example, thumbnails may be displayed in the interface 203 in FIG. 2B (a) to FIG. 2B (d) or the interface 305 in FIG. 3B (a) to FIG. 3B (e), and a user selects an image from the thumbnails.

"A plurality of" in the embodiments of this application indicates "two or more".

It should be noted that, the term "and/or" in this specification describes only an association relationship between associated objects and represents that three relationships may exist. For example, A and/or B may represent the following three cases: Only A exists, both A and B exist, and only B exists. In addition, unless otherwise specified, the character "/" in this specification generally indicates an "or" relationship between the associated objects. In the descriptions of the embodiments of this application, terms such as "first" and "second" are only used for distinction and description, but cannot be understood as indication or implication of relative importance, and cannot be understood as an indication or implication of a sequence.

The following describes the electronic device, a graphical user interface (graphical user interface, GUI) used for such an electronic device, and embodiments for using such an electronic device. In some embodiments of this application, the electronic device may be a portable terminal including a display, for example, a mobile phone or a tablet computer. An example embodiment of the portable electronic device includes but is not limited to a portable electronic device using iOS®, Android®, Microsoft®, or another operating system. The foregoing portable electronic device may be another portable electronic device such as a digital camera. It should be further understood that, in some other embodiments of this application, the electronic device may not be a portable electronic device, but is a desktop computer or the like with a display.

Generally, the electronic device supports a plurality of applications, for example, one or more of the following applications: a camera application, an instant messaging application, and a photo management application. There may be a plurality of instant messaging applications such as WeChat (Wechat), Weibo, Tencent chat software (QQ), WhatsApp Messenger, Line (Line), Instagram (instagram), Kakao Talk, and Dingtalk. The user may send information such as text, voice, an image, a video file, and another file to another contact (or another contact) through the instant messaging application. Alternatively, the user may implement a video call or a voice call with another contact through the instant messaging application.

For example, the electronic device is a mobile phone. FIG. 1A is a schematic diagram of a structure of a mobile phone 100.

The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the mobile phone 100. The controller may generate an operation control signal based on instruction operation code and a time sequence signal, to complete control of instruction fetching and instruction execution. A memory may further be disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

The processor 100 may run the software code of an image sharing algorithm provided in the embodiments of this application, to implement an image sharing process.

The USB interface 130 is an interface that conforms to a USB standard specification, and may be specifically a mini USB interface, a micro USB interface, a USB type-C interface, or the like. The USB interface 130 may be configured to connect to a charger to charge the mobile phone 100, and may be configured to transmit data between the mobile phone 100 and a peripheral device.

The charging management module 140 is configured to receive a charging input from the charger. The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like.

A wireless communications function of the mobile phone 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the mobile phone 100 may be configured to cover one or more communications frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution, applied to the mobile phone 100, to wireless communication including 2G/3G/4G/5G and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a solution, applied to the mobile phone 100, to wireless communication including wireless local area networks (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more devices that integrate at least one communication processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the mobile phone 100, the antenna 1 and the mobile communications module 150 are coupled, and the antenna 2 and the wireless communications module 160 are coupled, so that the mobile phone 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), satellite based augmentation systems (satellite based augmentation systems, SBAS), and/or the like.

The mobile phone 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro- OLED, quantum dot light emitting diodes (quantum dot light emitting diodes, QLEDs), or the like. In some embodiments, the mobile phone 100 may include one or N displays 194, where N is a positive integer greater than 1.

The camera 193 is configured to capture a static image or a video. The camera 193 may include a front-facing camera and a rear-facing camera.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, software code of at least one application (such as a camera application or a WeChat application), and the like. The data storage area may store data (for example, an image or a video) generated in a use process of the mobile phone 100. In addition, the internal memory 121 may include a high-speed random access memory, and may further include a nonvolatile memory, for example, at least one magnetic disk storage device, a flash memory device, or a universal flash storage (universal flash storage, UFS).

The internal memory 121 may further store software code of an image sharing method provided in the embodiments of this application. When the processor 110 runs the software code, procedure steps of the image sharing method are performed to implement an image sharing process.

The internal memory 121 may further store a class label and the like of a photographed image, model, or picture.

The external memory interface 120 may be configured to connect to an external storage card such as a micro SD card, to extend a storage capability of the mobile phone 100. The external storage card communicates with the processor 110 through the external memory interface 120, to implement a data storage function. For example, files such as music and a video are stored in the external storage card.

Certainly, software code of an image sharing method provided in the embodiments of this application may be alternatively stored in an external memory. The processor 110 may run the software code by using the external memory interface 120, to perform procedure steps of the image sharing method to implement an image sharing process. A class label and the like of an image, a model, or an image photographed by the mobile phone 100 may be alternatively stored in the external memory.

It should be understood that a user may specify whether to store an image in the internal memory 121 or the external memory. For example, when the mobile phone 100 is currently connected to the external memory, if the mobile phone 100 photographs an image, prompt information may pop up to indicate the user to determine whether to store the image in the external memory or the internal memory 121. Certainly, there is another specifying manner, and this is not limited in this embodiment of this application. Alternatively, when detecting that a memory amount of the internal memory 121 is less than a preset amount, the mobile phone 100 may automatically store an image in the external memory.

The mobile phone 100 may implement an audio function such as music playing or recording by using the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed on the display 194.

The gyroscope sensor 180B may be configured to determine a moving posture of the mobile phone 100. In some embodiments, an angular velocity of the mobile phone 100 around three axes (namely, x, y, and z axes) may be determined by using the gyroscope sensor 180B. The gyroscope sensor 180B may be configured to implement image stabilization during photographing.

The barometric pressure sensor 180C is configured to measure barometric pressure. In some embodiments, the mobile phone 100 calculates an altitude by using the barometric pressure measured by the barometric pressure sensor 180C, to assist in positioning and navigation.

The magnetic sensor 180D includes a Hall sensor. The mobile phone 100 may detect opening and closing of a flip leather case by using the magnetic sensor 180D. In some embodiments, when the mobile phone 100 is a clamshell phone, the mobile phone 100 may detect opening and closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect values of acceleration in various directions (usually on three axes) of the mobile phone 100. When the mobile phone 100 is static, a value and a direction of gravity may be detected. The acceleration sensor 180E may be further configured to identify a posture of the electronic device, and is applied to an application such as switching between landscape mode and portrait mode and a pedometer.

The range sensor 180F is configured to measure a distance. The mobile phone 100 may measure a distance through infrared light or a laser. In some embodiments, in a photographing scenario, the mobile phone 100 may measure a distance by using the distance sensor 180F, to implement fast focusing.

The optical proximity sensor 180G may include, for example, a light-emitting diode (LED) and an optical detector, for example, a photodiode. The light-emitting diode may be an infrared light-emitting diode. The mobile phone 100 emits infrared light through the light-emitting diode. The mobile phone 100 detects infrared reflected light from a nearby object by using the photodiode. When sufficient reflected light is detected, the mobile phone 100 may determine that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear to make a call, so as to automatically turn off a screen for power saving. The optical proximity sensor 180G may also be used in a smart cover mode or a pocket mode to automatically perform screen unlocking or locking.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the mobile phone 100 is in a pocket to prevent an accidental touch.

The fingerprint sensor 180H is configured to collect a fingerprint. The mobile phone 100 may use a feature of the collected fingerprint to implement fingerprint unlocking, application lock access, fingerprint-based photographing, fingerprint-based call answering, and the like.

The temperature sensor 180J is configured to detect a temperature. In some embodiments, the mobile phone 100 executes a temperature processing policy based on the temperature detected by the temperature sensor 180J. For example, when the temperature reported by the temperature sensor 180J exceeds a threshold, the mobile phone 100 lowers performance of a processor near the temperature sensor 180J, to reduce power consumption for thermal protection. In some other embodiments, when the temperature is lower than another threshold, the mobile phone 100 heats the battery 142 to prevent the mobile phone 100 from being shut down abnormally due to a low temperature. In some other embodiments, when the temperature is lower than still another threshold, the mobile phone 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the mobile phone 100 at a location different from that of the display 194.

The bone conduction sensor 180M may obtain a vibration signal. In some embodiments, the bone conduction sensor 180M may obtain a vibration signal of a vibration bone of a human voice part. The bone conduction sensor 180M may also be in contact with a human pulse, and receive a blood pressure beating signal.

The button 190 includes a power button, a volume button, and the like. The button 190 may be a mechanical button, or may be a touch button. The mobile phone 100 may receive a button input, and generate a button signal input related to user setting and function control of the mobile phone 100.

The motor 191 may generate a vibration prompt. The motor 191 may be configured to provide an incoming call vibration prompt or a touch vibration feedback. For example, touch operations performed on different applications (for example, a photographing application and an audio playing application) may correspond to different vibration feedback effects.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the mobile phone 100.

It may be understood that the structure shown in this embodiment of this application does not constitute a specific limitation on the mobile phone 100. In some other embodiments of this application, the mobile phone 100 may include more or fewer components than those shown in the figure, or some components may be combined, or some components may be split, or there may be a different component layout. The components shown in the figure may be implemented by hardware, software, or a combination of software and hardware.

It should be noted that in the conventional technology, the mobile phone 100 stores a large quantity of images. When detecting an input operation (for example, an operation used to publish an image or an operation used to send an image to another contact), the mobile phone 100 displays thumbnails of all images. The user needs to select a thumbnail of a target image from the large quantity of thumbnails. Operations are cumbersome. In addition, the thumbnail usually cannot clearly display image content. Therefore, the user cannot accurately select the thumbnail of the target image with naked eyes, and the user usually needs to tap a thumbnail of an image to display the image, then slide the image left or right to display another image, and finally select the target image. Operations are cumbersome, and user experience is relatively poor.

In this embodiment of this application, the mobile phone 100 may analyze operation behaviors of the user on images, and classify the images into different image types based on the operation behaviors. For example, the mobile phone 100 classifies the images into image types of "you like" and "you dislike", image types of "suitable to be published" and "unsuitable to be published", or image types of "suitable to be sent to another contact" and "unsuitable to be sent to another contact". When detecting an operation used to publish an image, the mobile phone 100 may recommend an image of "you like" or "suitable to be published" to the user. When detecting an operation used to send an image to another contact, the mobile phone 100 may recommend an image of "you like" or an image of "suitable to be sent to another contact" to the user. Therefore, the mobile phone 100 may recommend, based on an input operation of the user, an image related to the input operation, and there is no need to search a large quantity of images for an image, so that user operations are simple.

In some embodiments, a software system of the mobile phone 100 may use a hierarchical architecture, an event-driven architecture, a micronucleus architecture, a microservice architecture, or a cloud architecture. An Android (Android) system of the hierarchical architecture is used as an example in the following embodiments to describe a software structure of the mobile phone 100.

Figure 1B:
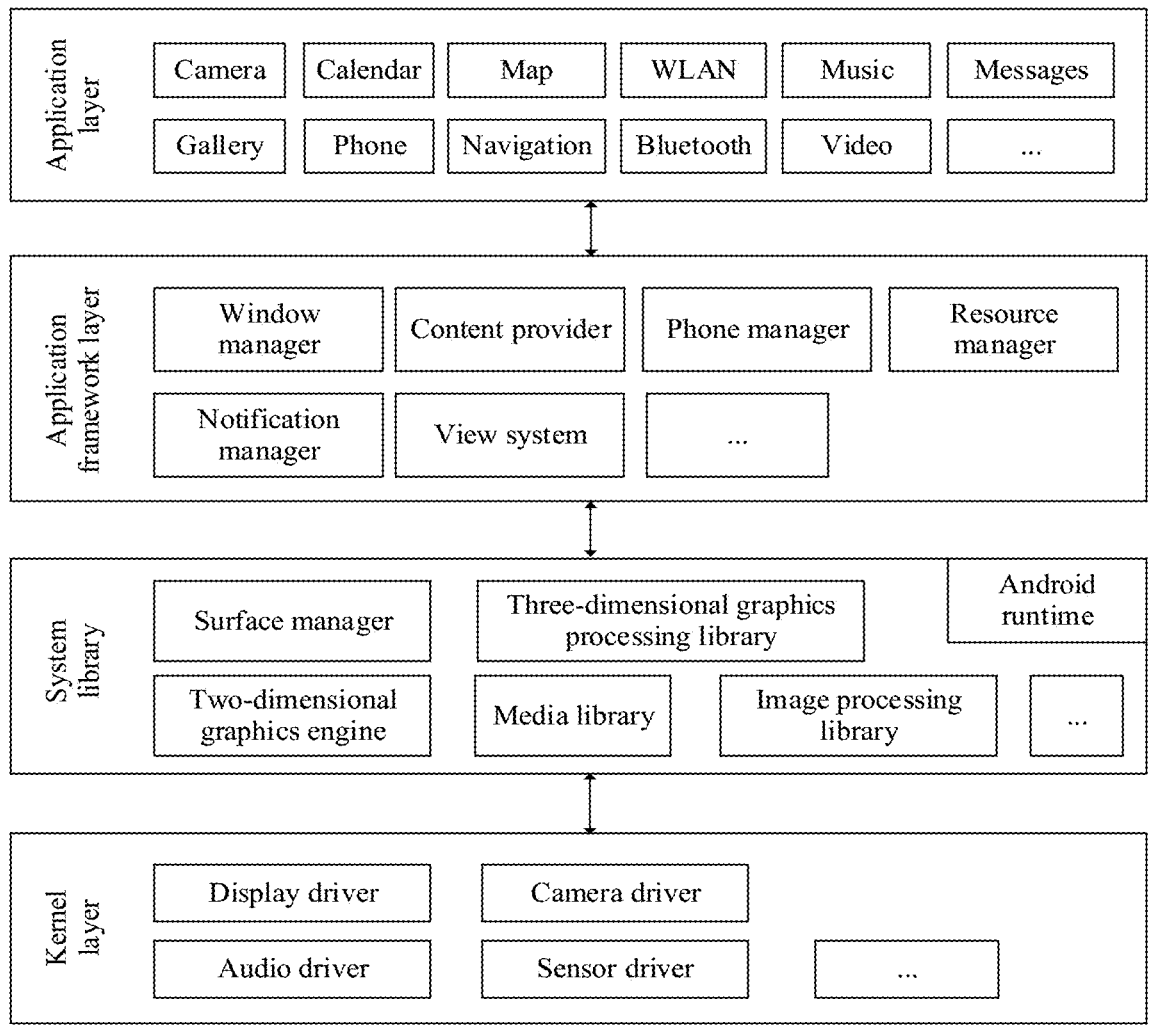
FIG. 1B is a schematic diagram of a software architecture of a mobile phone 100 according to an embodiment of this application.

FIG. 1B is a block diagram of the software structure of the mobile phone 100 according to an embodiment of this application. In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages. As shown in FIG. 1B, the application package may include applications such as "camera", "gallery", "calendar", "phone", "map", "navigation", "WLAN", "Bluetooth", "music", "video", and "messages". The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like. The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, calls that are made and received, a browsing historical record and bookmarks, a phone book, and the like. The view system includes visual controls, such as a control for displaying a text and a control for displaying an image. The view system may be configured to construct an application. A display interface may include one or more views. For example, a display interface including an SMS message notification icon may include a text display view and an image display view. The phone manager is configured to provide a communication function of the mobile phone 100, for example, management of a call status (including answering or declining a call). The resource manager provides various resources for an application, such as a localized character string, an icon, an image, a layout file, and a video file. The notification manager enables an application to display notification information in a status bar, and may be configured to convey a notification message. The notification manager may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system. The kernel library includes two parts: a function that needs to be invoked in Java language and a kernel library of Android. The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), media libraries (Media Libraries), a three-dimensional graphics processing library (for example, OpenGL ES), and a 2D graphics engine (for example, SGL). The surface manager is configured to manage a display subsystem and provide fusion of 2D and 3D layers for a plurality of applications. The media library supports playback and recording of a plurality of commonly used audio and video formats, static image files, and the like. The media library may support a plurality of audio and video coding formats, for example, MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

In this embodiment of this application, refer to FIG. 1B. The system library may further include an image processing library. When detecting operation behaviors on images, the image processing library may classify the images. For example, when detecting an operation behavior on at least one image in a group of associated images, the image processing library classifies the at least one image. When detecting an input operation again, the image processing library may determine at least one image related to the input operation from a group of associated images, and recommend the at least one image.

For ease of understanding, a mobile phone having the structures shown in FIG. 1A and FIG. 1B is used as an example in the following embodiments of this application, and the display method provided in the embodiments of this application is specifically described with reference to the accompanying drawings. The following describes an implementation process of the technical solutions of this application by using different application scenarios.

Scenario 1: Gallery Application

Figure 2A:
FIG. 2A (a) to FIG. 2A (c) are schematic diagrams of graphical user interfaces of a mobile phone 100 according to an embodiment of this application.
Figure 2A:
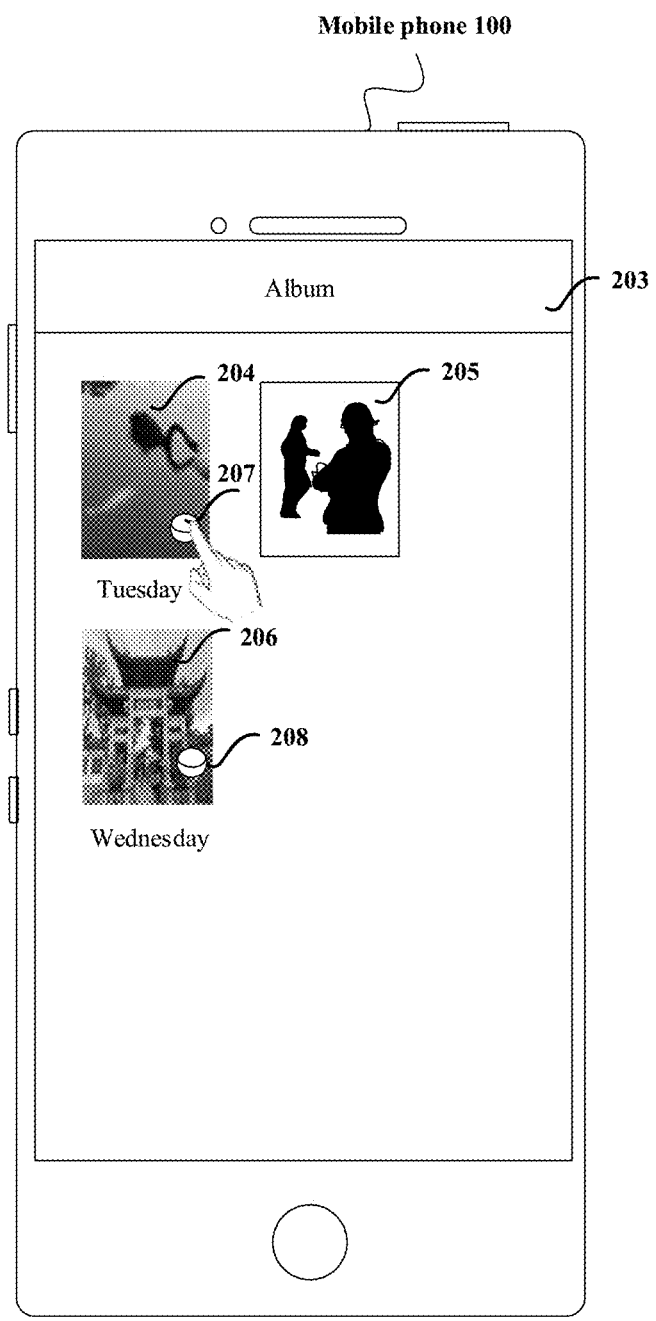
Figure 2A:
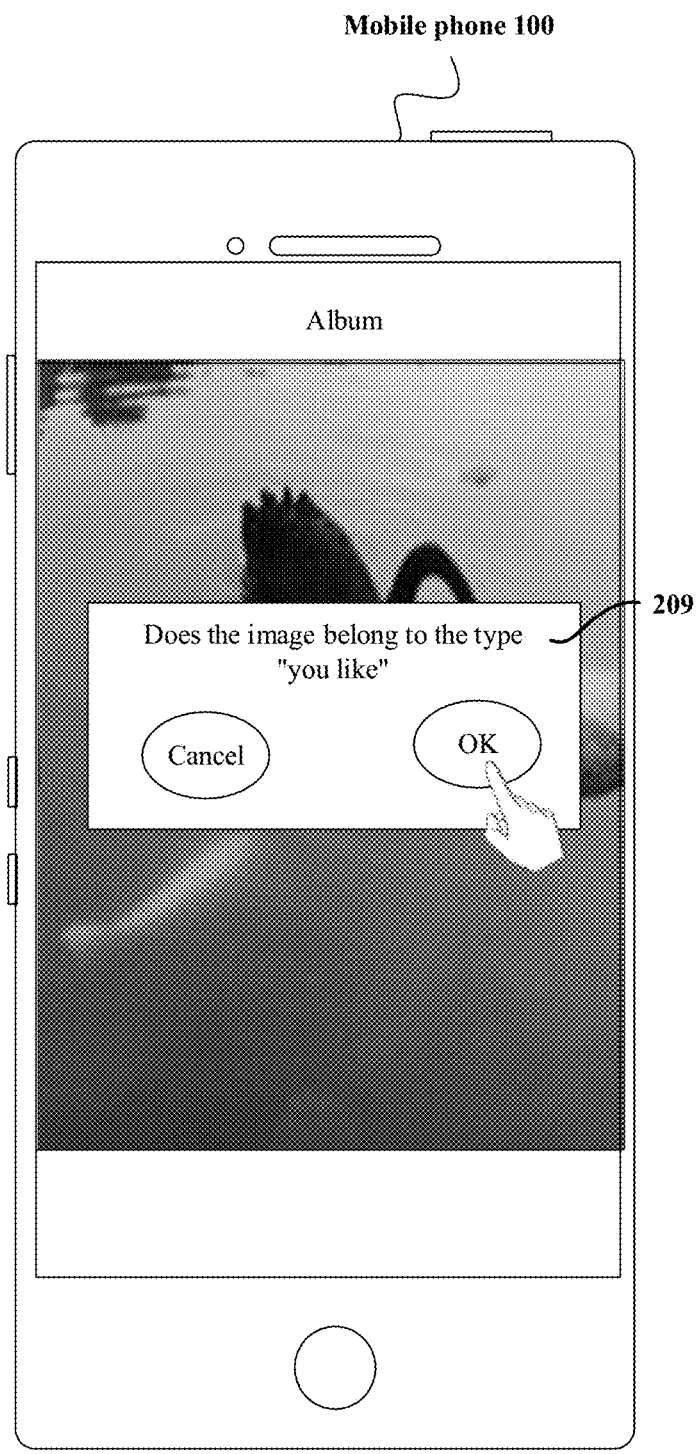

As shown in FIG. 2A (a), a mobile phone 100 displays a home screen 201, and the home screen 201 includes application icons of a plurality of applications (a camera application, the gallery application, a WeChat application, and the like). When the mobile phone 100 detects an operation of triggering an icon 202 of the gallery application by a user, the mobile phone 100 displays an interface 203 of the gallery application, as shown in FIG. 2A (b).

As shown in FIG. 2A (b), the mobile phone 100 displays the interface 203 of the gallery application, and the interface 203 includes a thumbnail of an image stored in the mobile phone 100. Thumbnails of three images are used as an example in FIG. 2A (b).

In an example, a mark is displayed on a thumbnail of an image of "you like", and the mark is used to indicate that the image belongs to the image type of "you like". In other words, an image whose thumbnail includes a mark belongs to the image type of "you like", and an image that does not include a mark belongs to an image type of "you dislike". As shown in FIG. 2A (b), a mark 207 is displayed on an image 204, and a mark 208 is displayed on an image 206. In other words, the image 204 and the image 206 belong to the image type of "you like".

For example, when detecting an operation of triggering the mark 207 by the user, the mobile phone 100 displays prompt information. The prompt information is used to indicate, to the user, that the image 204 is an image the user likes. As shown in FIG. 2A (c), the mobile phone 100 may further display an "OK" control and a "cancel" control. When the "OK" control is triggered, the mobile phone 100 determines that the image 204 belongs to the type of "you like". When the "cancel" control is triggered, the mobile phone 100 determines that the image 204 does not belong to the type of "you like", and cancels display of the mark 207 on the image 204.

Figure 2B:
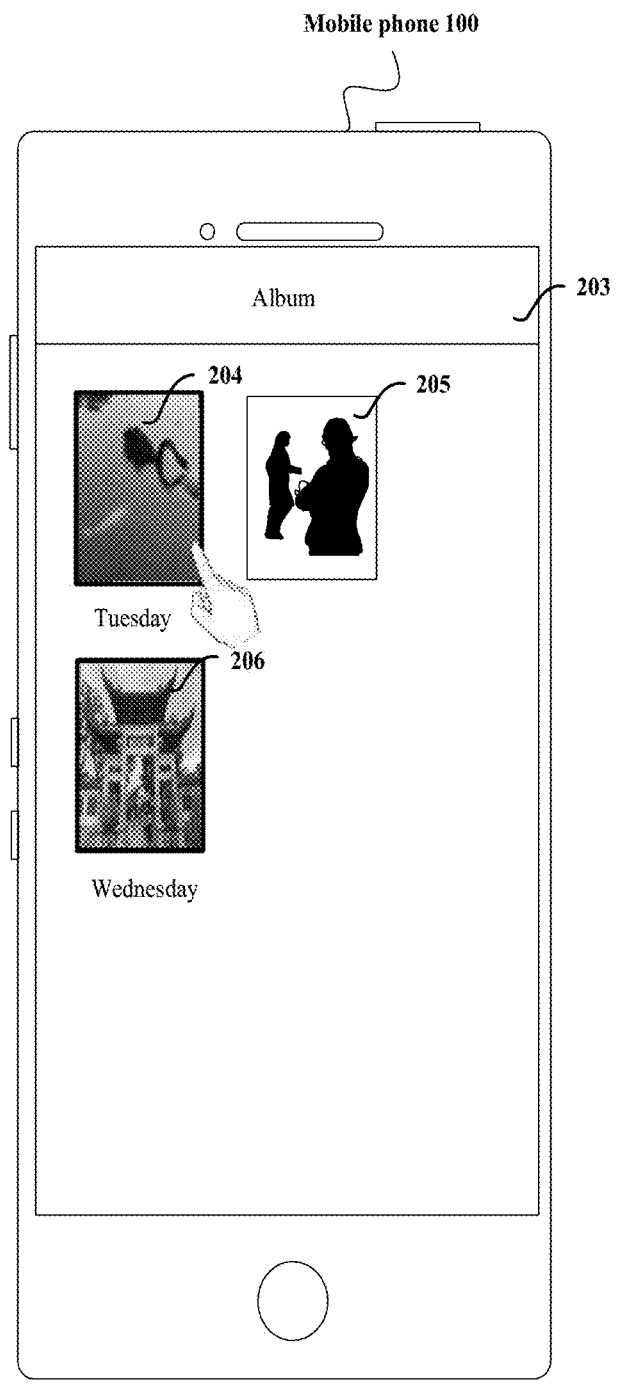
FIG. 2B (a) to FIG. 2B (d) are schematic diagrams of graphical user interfaces of a mobile phone 100 according to an embodiment of this application.
Figure 2B:
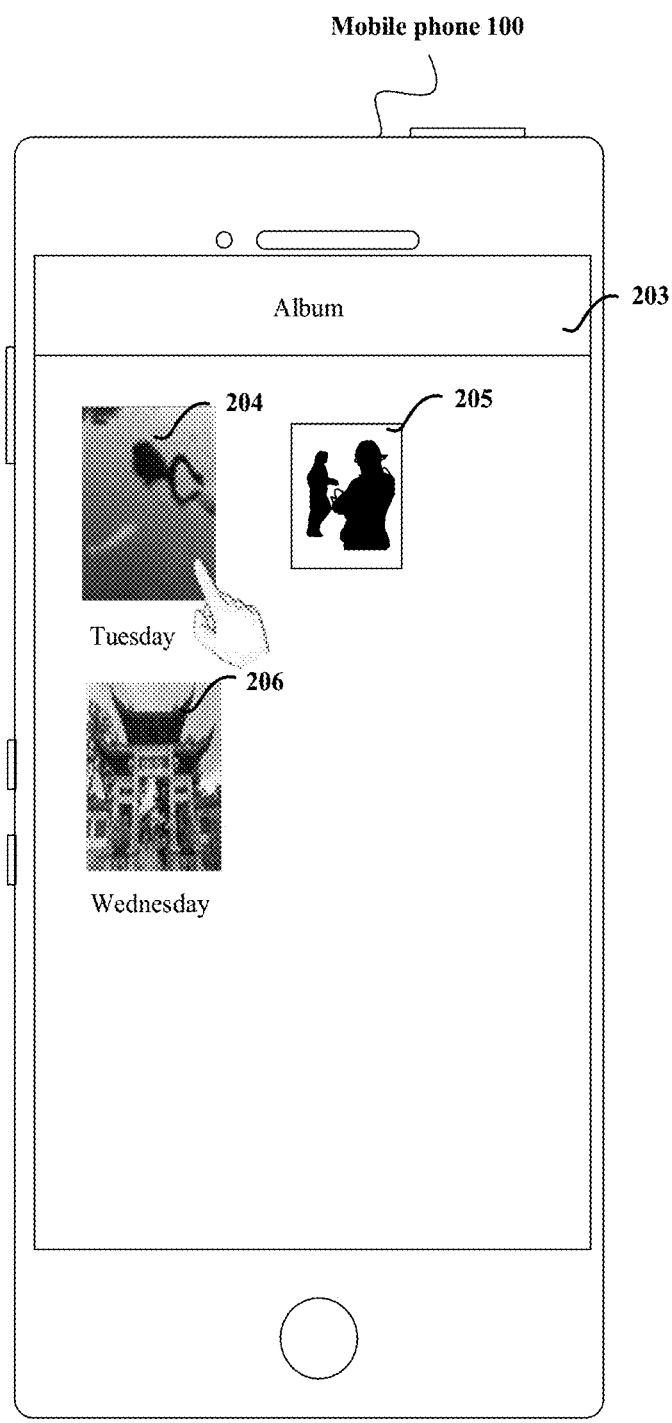
Figure 2B:
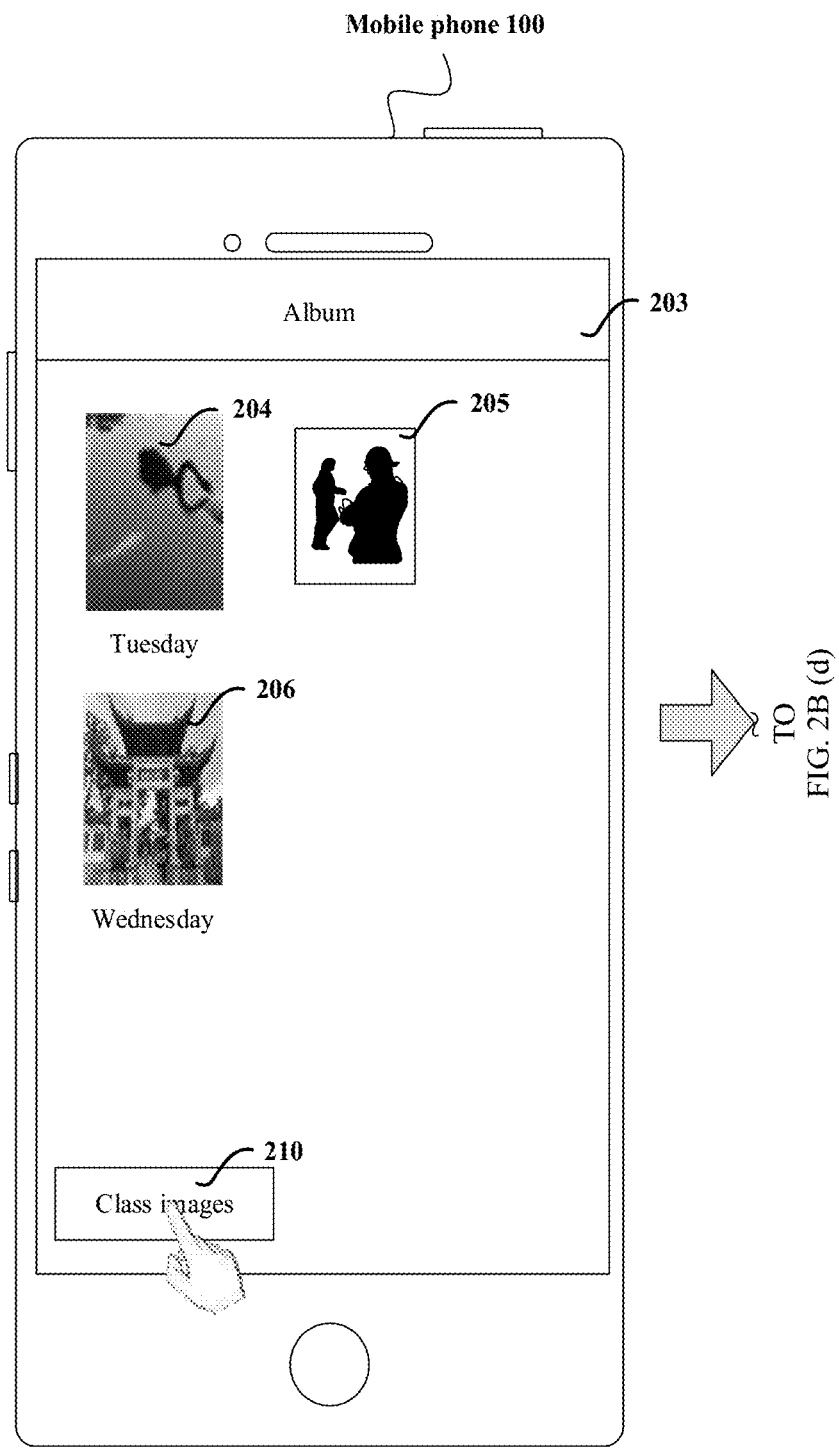
Figure 2B:
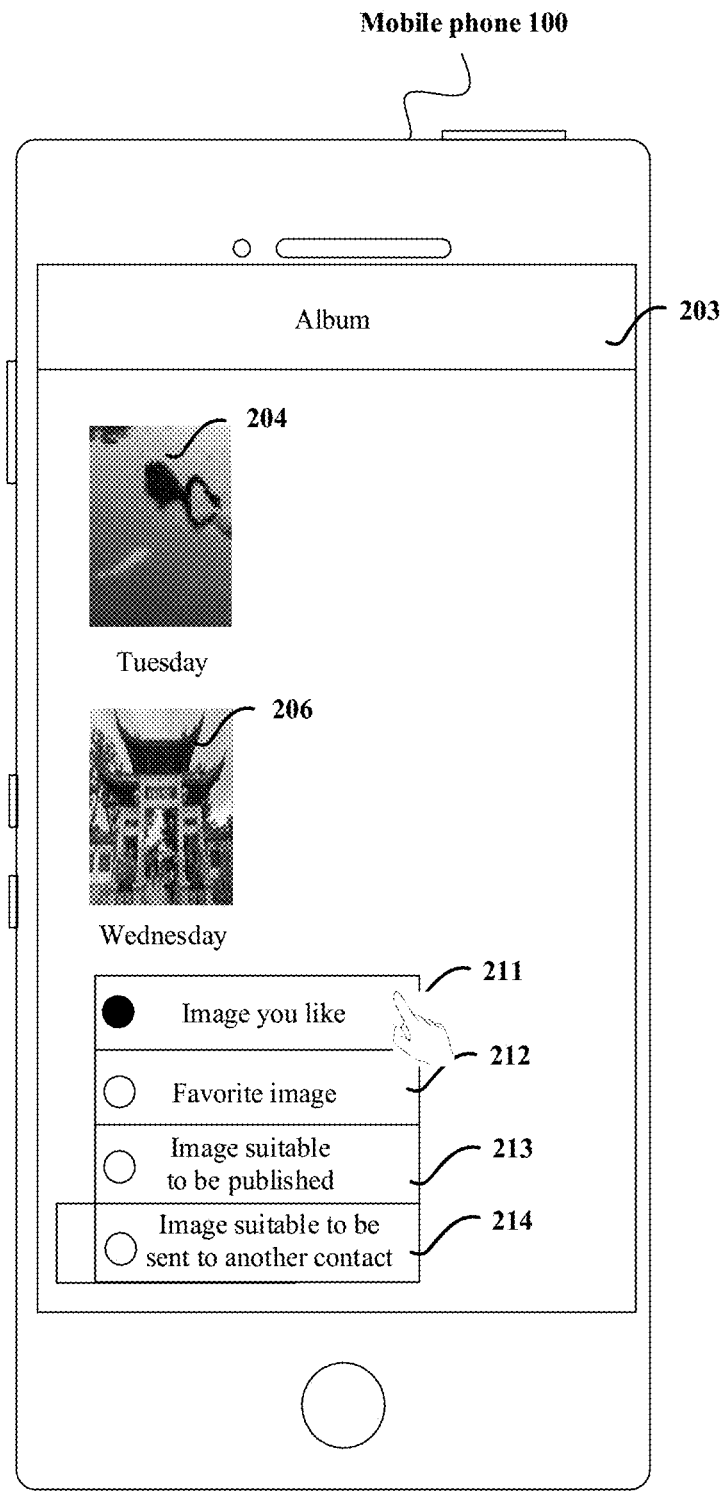

In other examples, as shown in FIG. 2B (a), an edge of a thumbnail of an image of "you like" is bold, and an edge of a thumbnail of another image is not bold. In other examples, a size of a thumbnail of an image of "you like" is relatively large, and a size of a thumbnail of another image is relatively small. For example, as shown in FIG. 2B (b), sizes of the thumbnail 204 and the thumbnail 206 are greater than a size of a thumbnail 205. In other examples, as shown in FIG. 2B (c), the interface 203 of the gallery application includes a "classify images" control 210. When the control 210 is triggered, the mobile phone 100 displays a plurality of options. As shown in FIG. 2B (d), the mobile phone 100 displays an "image you like" option 211, a "favorite image" option 212, an "image suitable to be published" option 213, and an "image suitable to be sent to another contact" option 214. Assuming that the option 211 is selected, the mobile phone 100 displays only an image of "you like". As shown in FIG. 2B (d), only the image 204 and the image 206 are displayed.

In Scenario 1, different identification information is displayed for different types of images in the interface of the gallery application, so that the user can quickly search for an image. In addition, types of images are obtained by the mobile phone 100 by performing classification based on operation behaviors of the user on the images. Therefore, image type classification complies with an operation habit of the user, so that user experience is improved.

Scenario 2: Social Platform

Figure 3A:
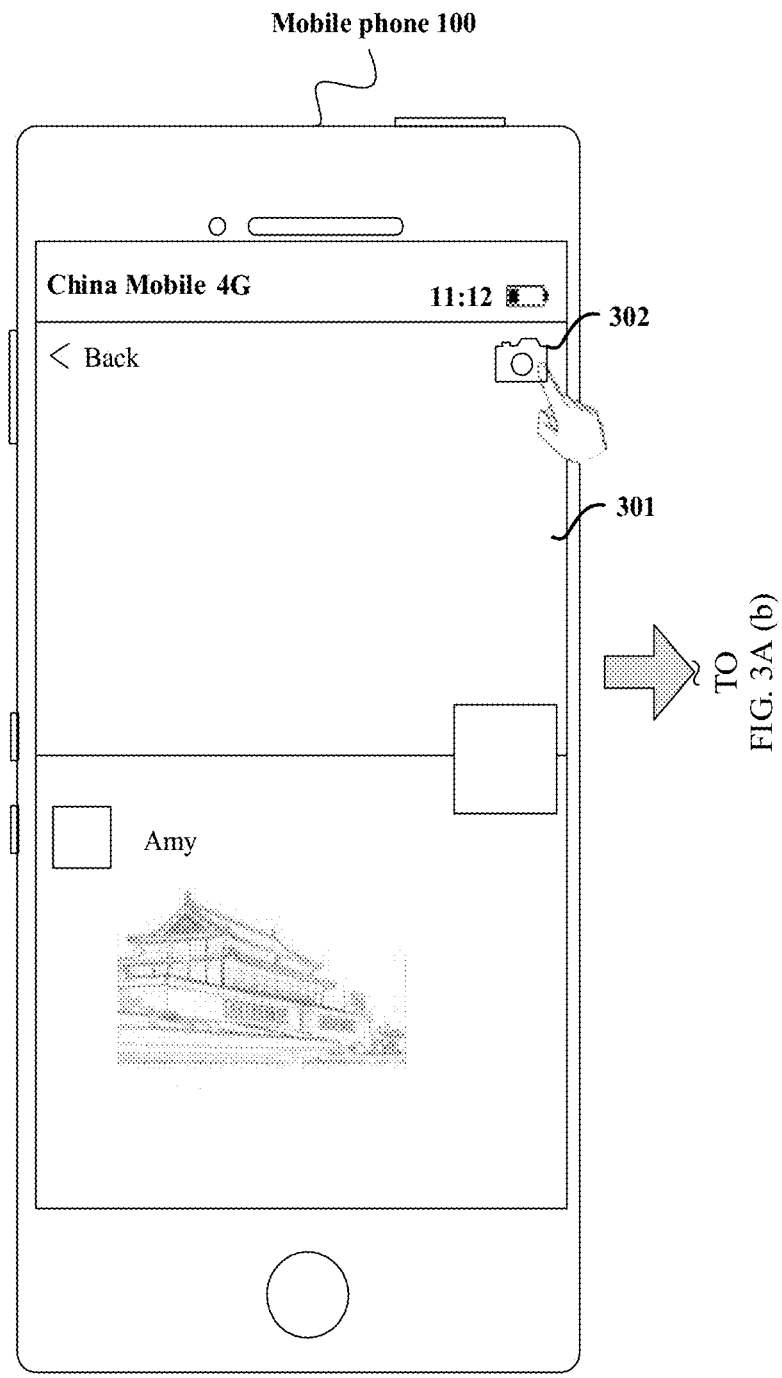
FIG. 3A (a) to FIG. 3A (d) are schematic diagrams of graphical user interfaces of a mobile phone 100 according to an embodiment of this application.
Figure 3A:
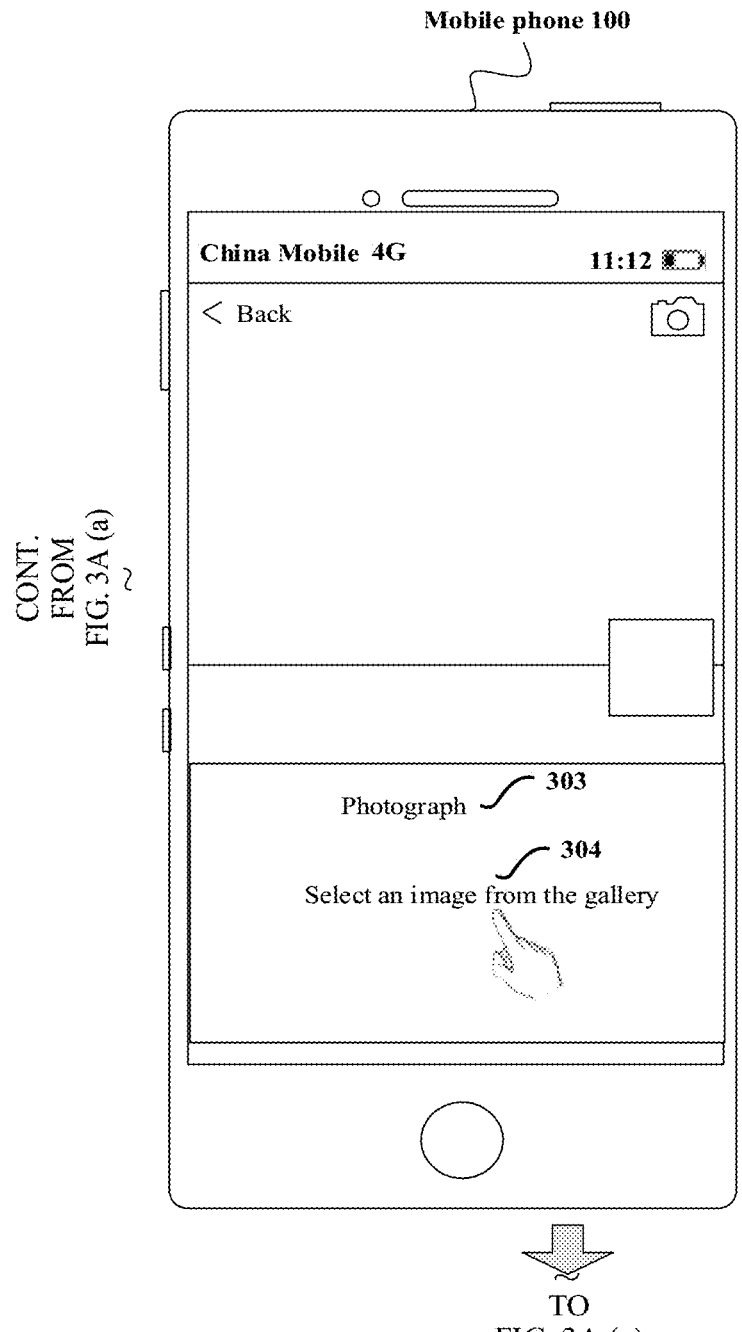
Figure 3A:
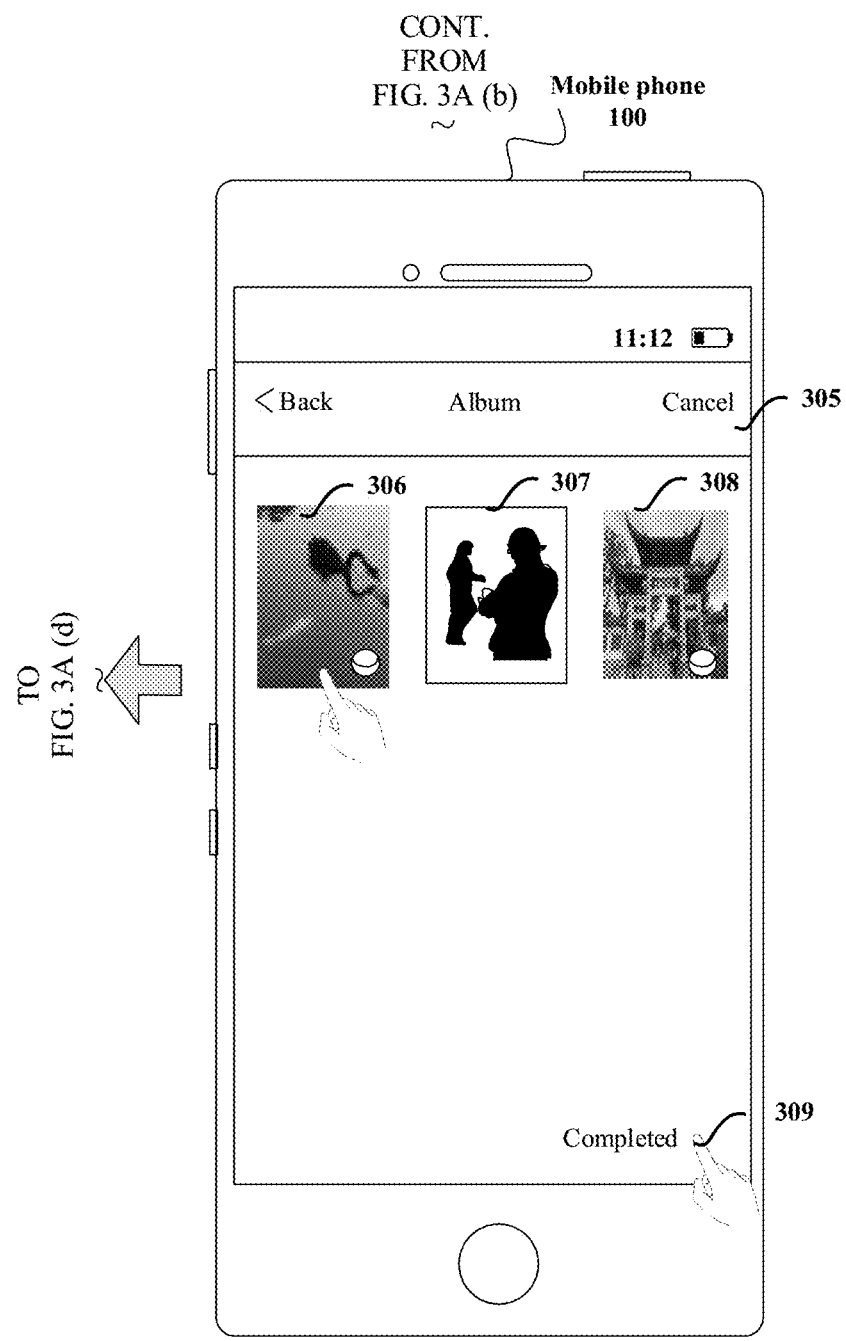
Figure 3A:
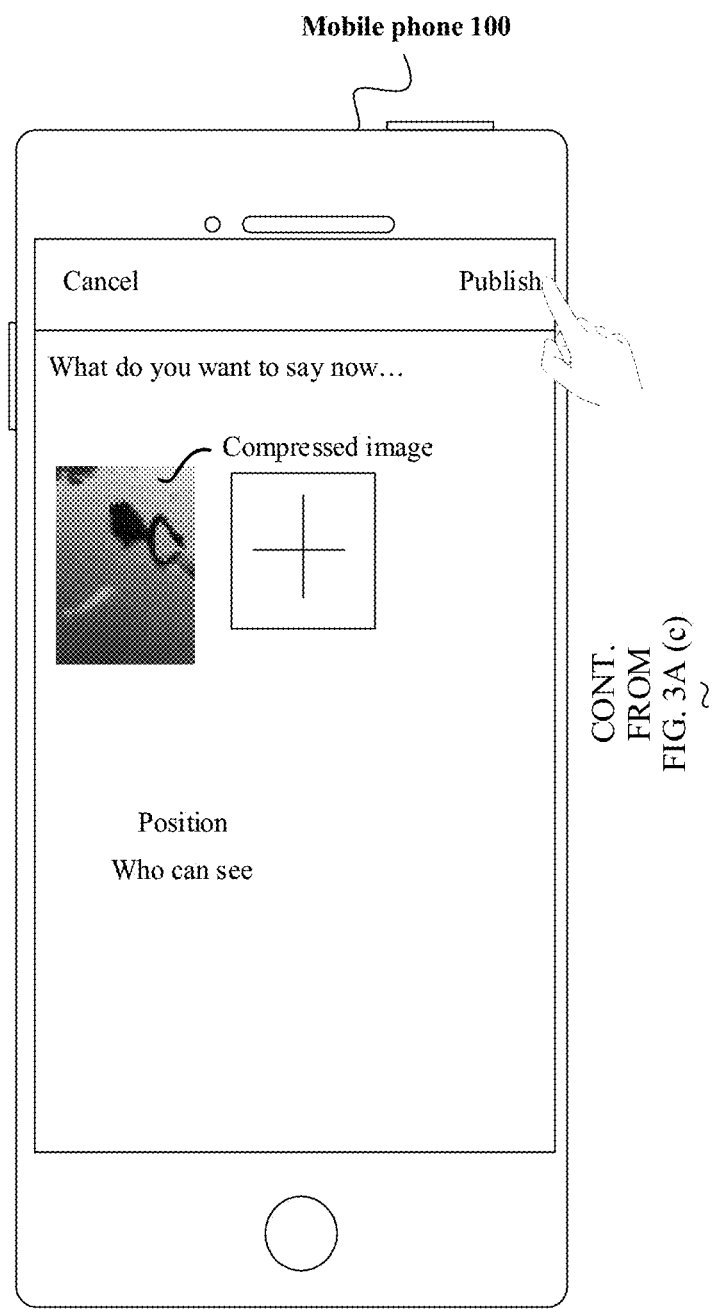

As shown in FIG. 3A (a), a mobile phone 100 displays an interface 301 of a WeChat application, and the interface 301 includes a control 302. When the control 302 is triggered, the mobile phone 100 displays a "photograph" option 303 and a "select an image from the gallery" option 304, as shown in FIG. 3A (b).

When the mobile phone 100 detects that the "select an image from the gallery" option 304 is selected, the mobile phone 100 displays an interface 305 for selecting an image, as shown in FIG. 3A (c). The interface 305 for selecting an image includes one or more images.

In an example, as shown in FIG. 3A (c), the interface 305 for selecting an image includes thumbnails of a plurality of images in the gallery in the mobile phone 100. A mark may be displayed on a thumbnail of an image of "you like", and an image whose thumbnail does not include a mark is an image of "you dislike". Alternatively, the interface 305 for selecting an image includes thumbnails of a plurality of images in the gallery in the mobile phone 100. A mark is displayed on a thumbnail of an image of "suitable to be published", and a mark is not displayed on a thumbnail of an image of "unsuitable to be published". Alternatively, the interface 305 for selecting an image includes thumbnails of a plurality of images in the gallery in the mobile phone 100. A first mark is displayed on a thumbnail of an image of "you like", a second mark is displayed on a thumbnail of an image of "suitable to be published", and the first mark is different from the second mark.

As shown in FIG. 3A (c), marks are displayed on thumbnails of an image 306 and an image 308. In other words, the image 306 and the image 308 are images of "you like" or images of "suitable to be published". When detecting that the image 308 is selected, the mobile phone 100 displays an interface shown in FIG. 3A (d).

Figure 3B:
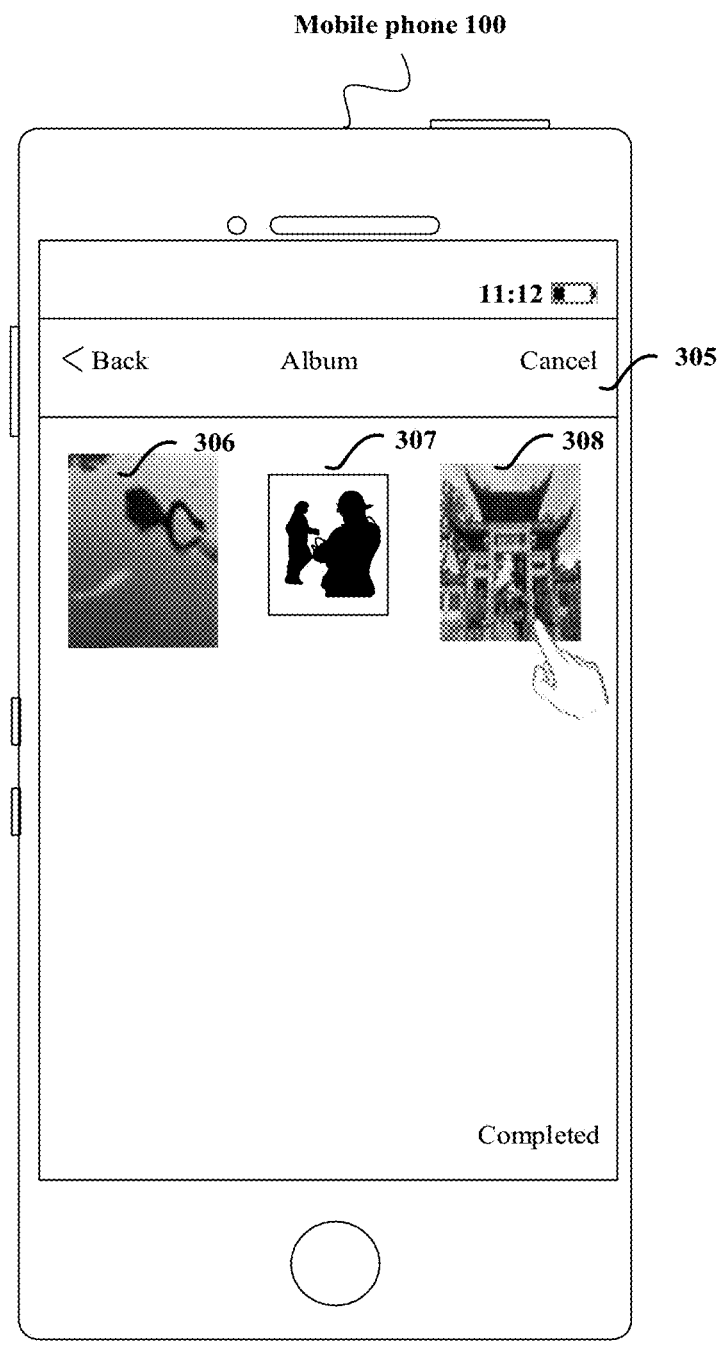
FIG. 3B (a) to FIG. 3B (e) are schematic diagrams of graphical user interfaces of a mobile phone 100 according to an embodiment of this application.
Figure 3B:
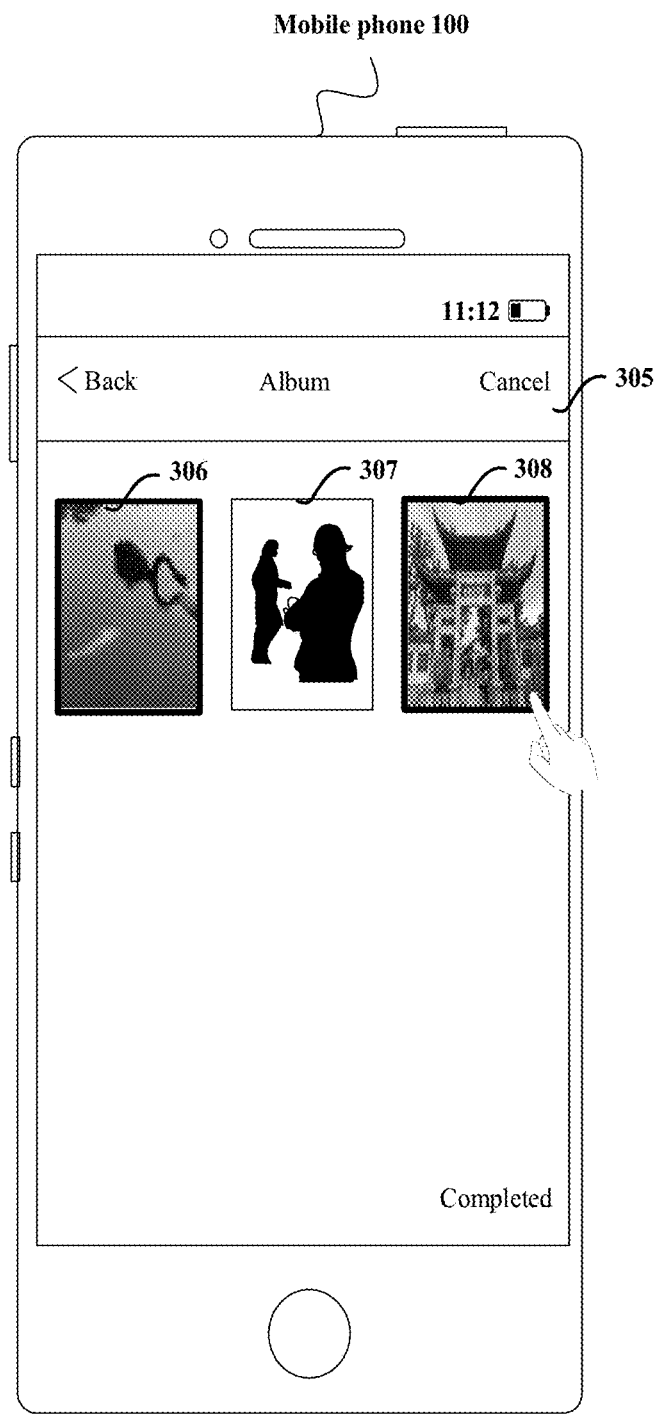
Figure 3B:
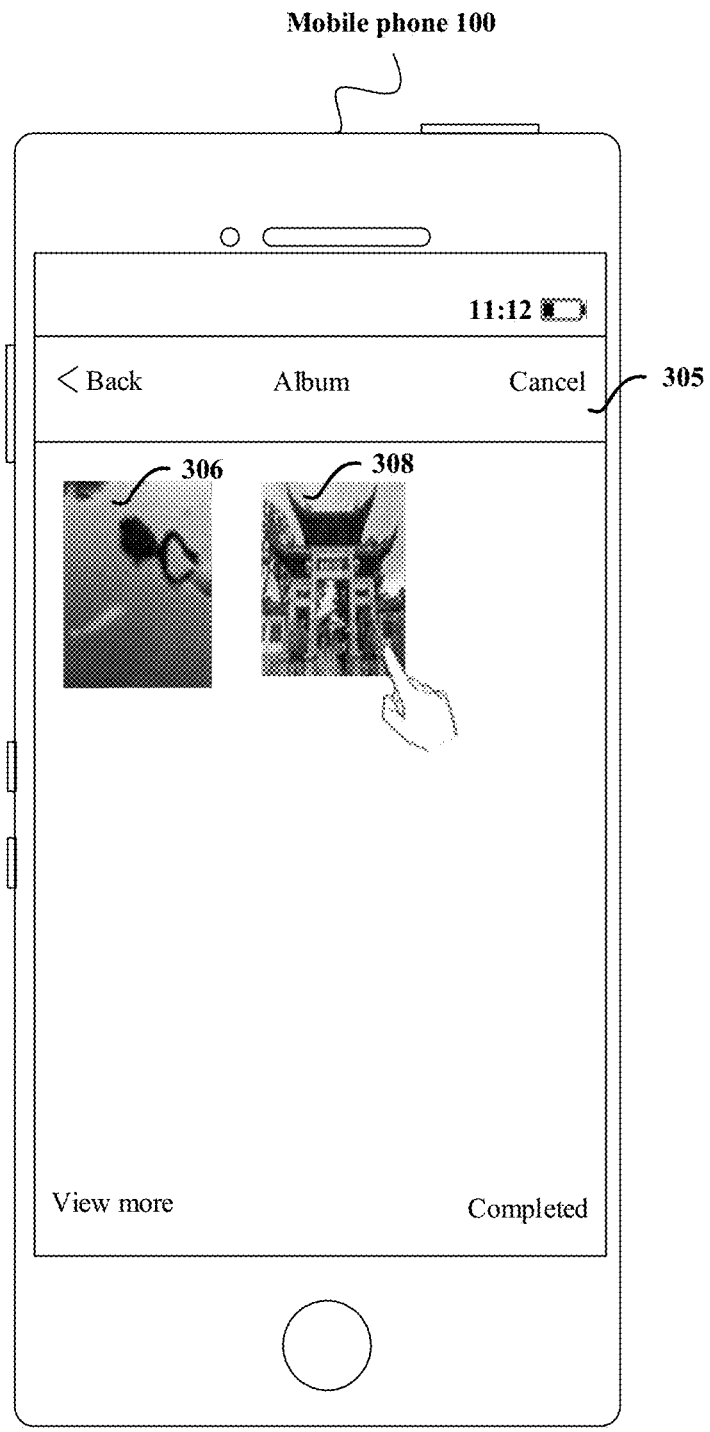
Figure 3B:
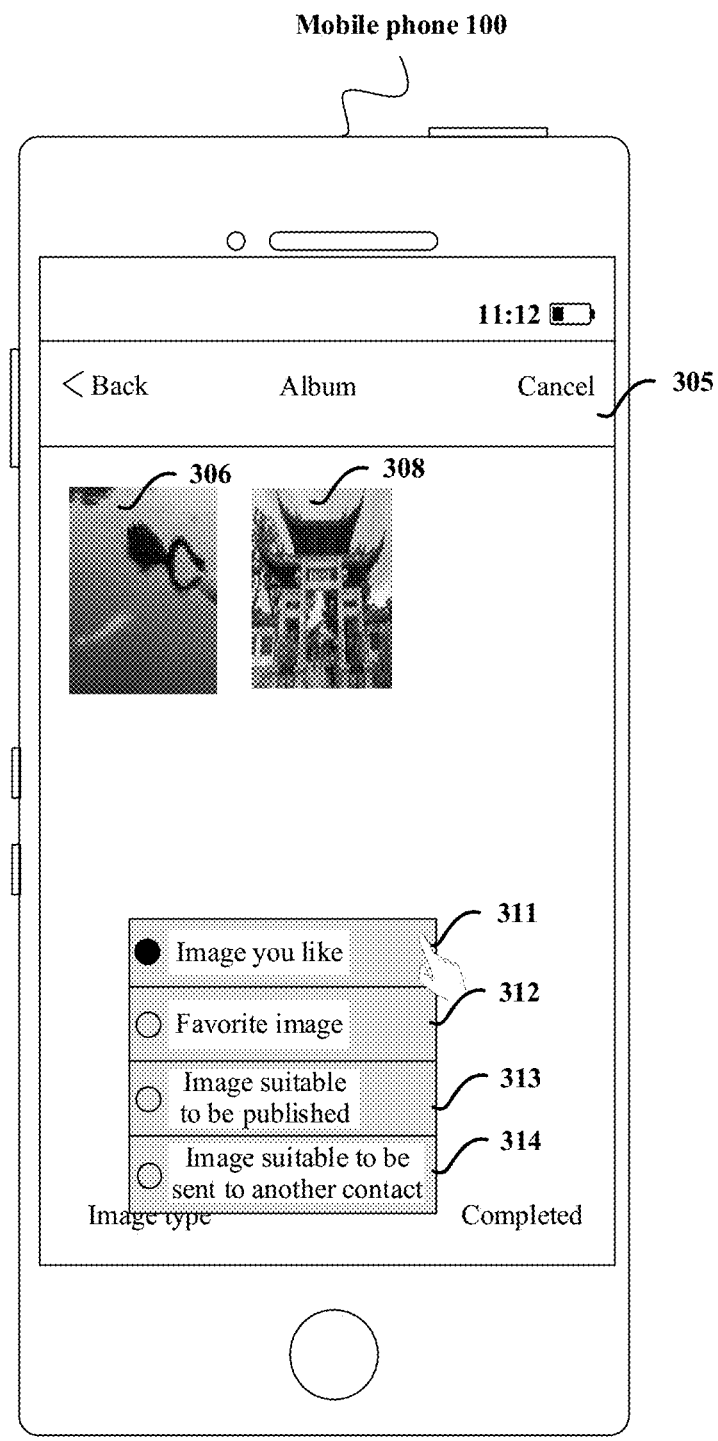
Figure 3B:
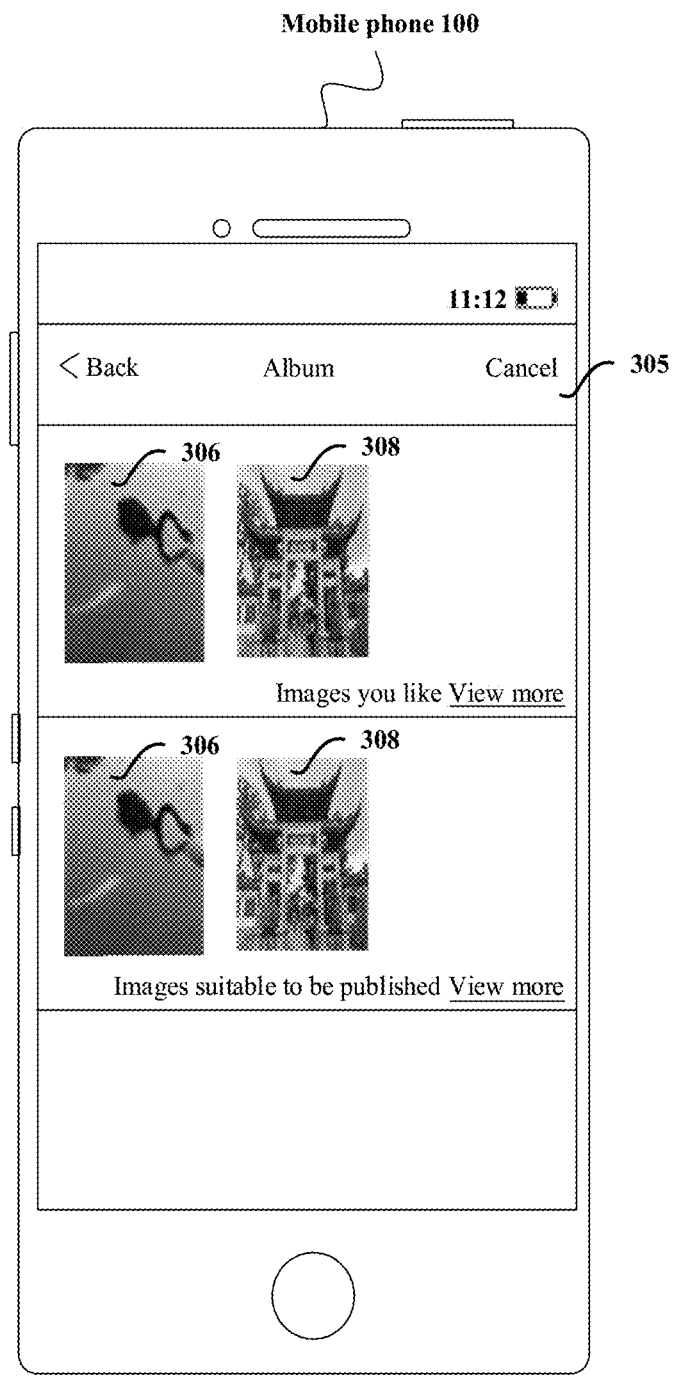

In other examples, as shown in FIG. 3B (a), in the interface 305 for selecting an image, a size of a thumbnail (for example, the image 306 and the image 308) of an image of "you like" or an image of "suitable to be published" is greater than a size of a thumbnail of another image (for example, an image 307).

For another example, as shown in FIG. 3B (b), in the interface 305 for selecting an image, an edge of a thumbnail (the image 306 and the image 308) of an image of "you like" or an image of "suitable to be published" is bold.

For another example, as shown in FIG. 3B (c), the interface 305 for selecting an image includes only two thumbnails of images. The two images are images of "you like" or images of "suitable to be published" or an image of "you like" and an image of "suitable to be published" selected by the mobile phone 100 from a large quantity of images in the gallery. In this example, the interface 305 for selecting an image includes only a recommended image but does not include an image that is not recommended. For example, the image that is not recommended may be hidden. Certainly, still as shown in FIG. 3B (c), the interface 305 for selecting an image includes a "view more" control. When the mobile phone 100 detects that the control is triggered, the mobile phone 100 displays more thumbnails.

For another example, as shown in FIG. 3B (d), the interface 305 for selecting an image includes an "image type" control. When the "image type" control is triggered, the mobile phone 100 displays a plurality of options, namely, an "image you like" option 311, a "favorite image" option 312, an "image suitable to be published" option 313, and an "image suitable to be sent to another contact" option 314. Assuming that the option 311 is selected, the mobile phone 100 displays only an image of "you like". As shown in FIG. 3B (d), the mobile phone 100 displays only the image 306 and the image 308.

For another example, as shown in FIG. 3B (e), different types of images are displayed in different regions in the interface 305 for selecting an image. An image a user likes is displayed in a first region. An image suitable to be published is displayed in a second region. In some embodiments, there may be a same image in images the user likes and images suitable to be published.

In FIG. 3A (a) to FIG. 3A (d) and FIG. 3B (a) to FIG. 3B (e), Moments of WeChat is used as an example. In an actual application, a similar manner may also be used for another social platform (for example, a Weibo application, Xiaohongshu, Facebook, or Twitter), and details are not described again.

In Scenario 2, when detecting an operation used to publish an image on a social platform, the mobile phone 100 may display an image of "suitable to be published" or an image of "you like" or display different identification information for different types of images (for example, a first identifier is displayed for an image of "suitable to be published", and a second identifier is displayed for an image of "you like"), so that the user quickly searches for an image. In addition, types of images are obtained by the mobile phone 100 by performing classification based on operation behaviors of the user on the images. Therefore, image type classification complies with an operation habit of the user, so that user experience is improved.

Scenario 3: Instant Messaging Application

Figure 4A:
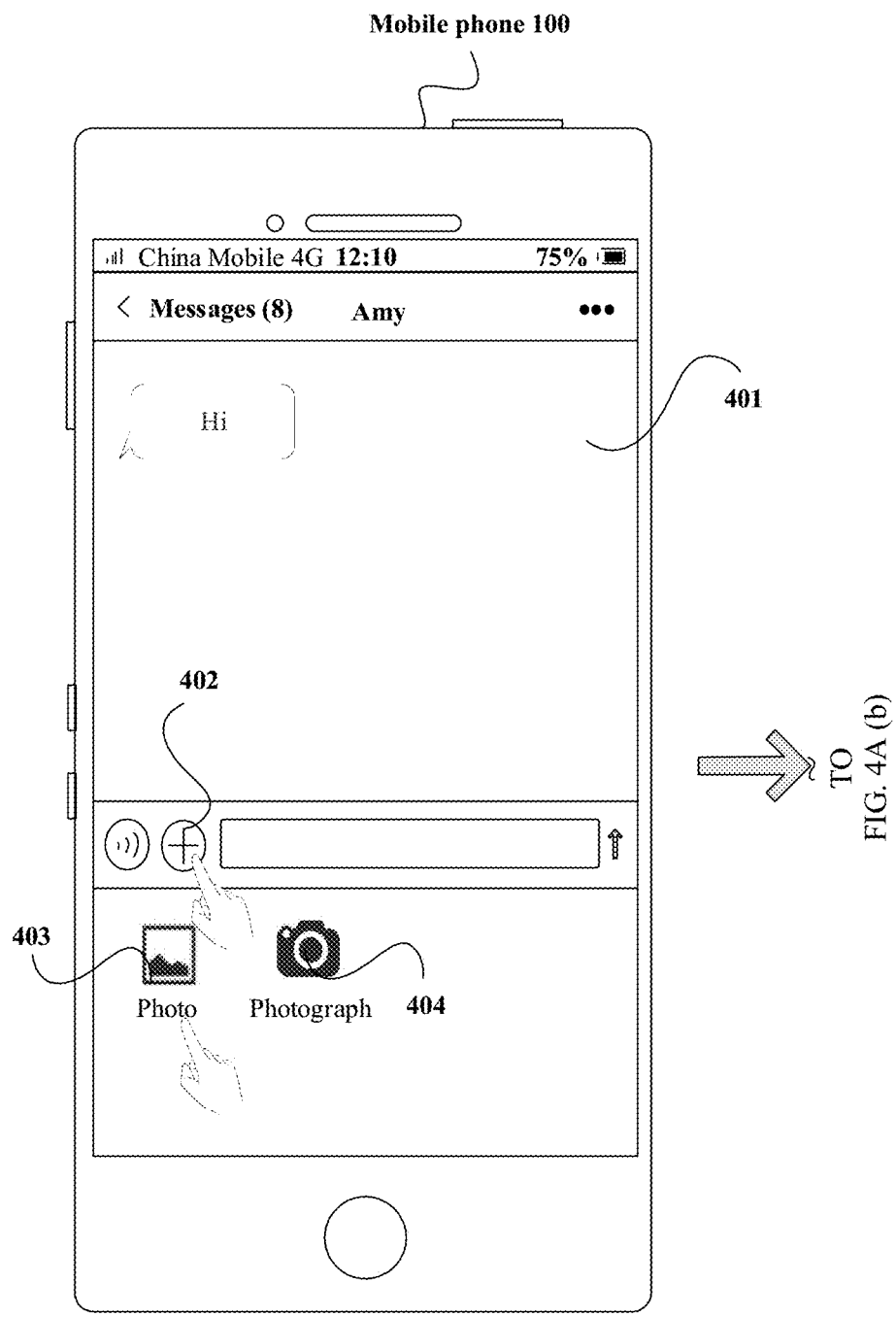
FIG. 4A (a) to FIG. 4A (c) are schematic diagrams of graphical user interfaces of a mobile phone 100 according to an embodiment of this application.
Figure 4A:
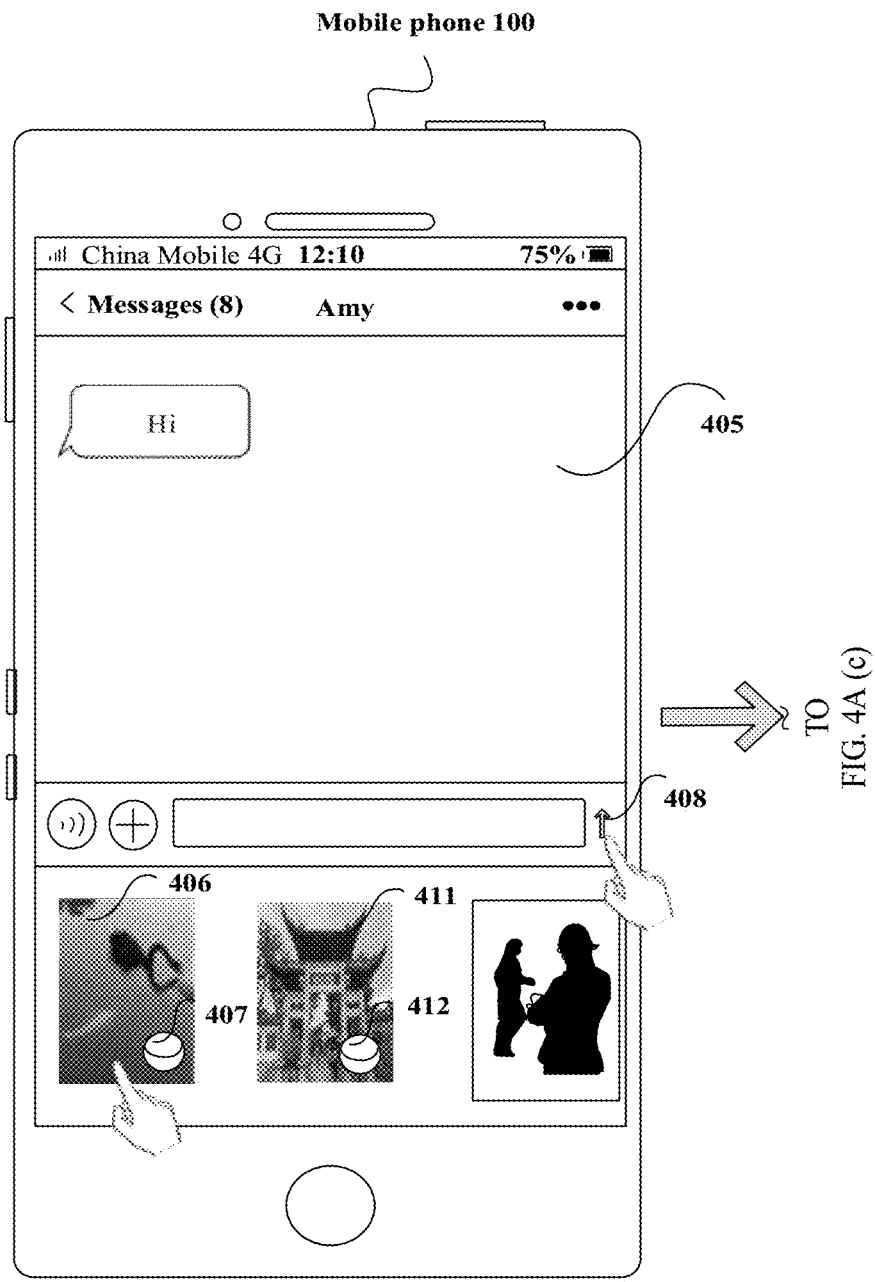
Figure 4A:
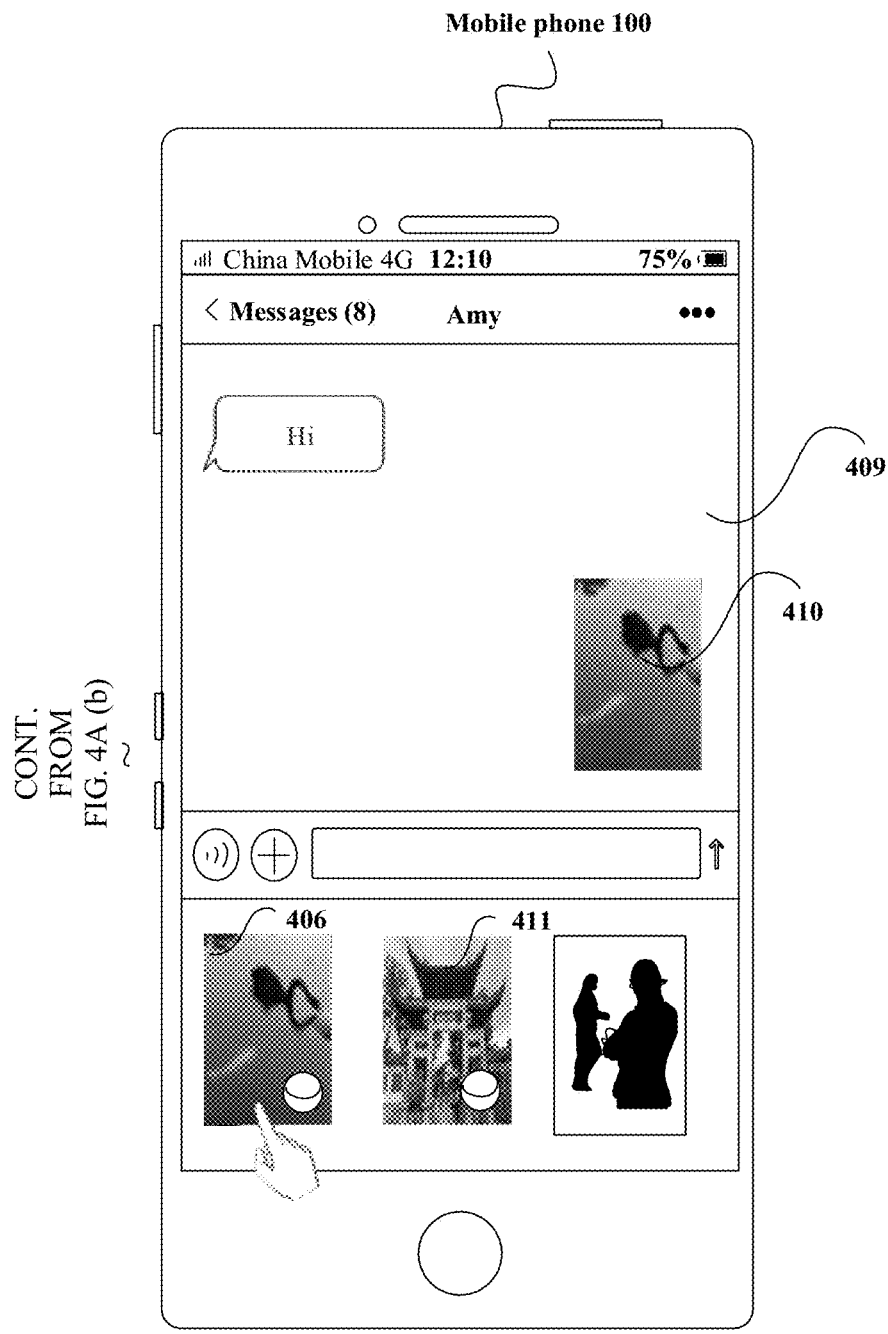

As shown in FIG. 4A (a), a mobile phone 100 displays an interface 401 of a messages application, and the interface 401 is a communication interface between a user and another contact. The interface 401 includes a control 402. When detecting that the control 402 is triggered, the mobile phone 100 displays a "gallery" control 403 and a "photograph" control 404.

In an example, when detecting that the user triggers the "gallery" control 403, the mobile phone 100 displays an interface 405 shown in FIG. 4A (b). The interface 405 includes thumbnails of a plurality of images. A mark 407 is set on an image 406 to indicate that the image 406 is an image of "you like", and a mark 412 is set on an image 411 to indicate that the image 411 is an image of "you like". Alternatively, the mark 407 is used to indicate that the image 406 is an image of "suitable to be sent to another contact", and the mark 412 is used to indicate that the image 411 is an image of "suitable to be sent to another contact". Alternatively, different marks are displayed on the image 406 and the image 411. It is assumed that a first mark is displayed on the image 406, a second mark is displayed on the image 411, the first mark is used to indicate that the image 406 is an image of "you like", and the second mark is used to indicate that the image 411 is an image of "suitable to be sent to another contact". Assuming that the mobile phone 100 detects that the image 406 is selected, and then detects an operation of triggering a "send" control 408 by the user, the mobile phone 100 sends the image 406 to a contact, and the mobile phone 100 displays an interface 409 shown in FIG. 4A (c). A mark is not displayed on an image 410 in the interface 409.

In some embodiments, the mobile phone 100 may determine an image type of "suitable to be sent to a specified contact". The specified contact may include a specified type of contact, a certain specified contact, or the like. The specified type of contact may be contacts belonging to a same group. Taking a WeChat application as an example, the specified type of contact may be all contacts belonging to a same WeChat chat group in the WeChat application, all contacts belonging to a same group (for example, family) in the WeChat application, or all contacts whose name remarks include a common word (for example, teacher) in the WeChat application. The certain specified contact may be a specific contact, and the electronic device may determine, based on name remarks of a contact, whether the contact is a specified contact. For example, the specified contact may include a contact whose name remarks are "father" and a contact whose name remarks are "mother". For example, if the mobile phone 100 learns that some images (for example, scenic images or portraits) are sent to a specified contact for a relatively large quantity of times, the mobile phone 100 determines that the images belong to "suitable to be sent to a specified contact". When the mobile phone 100 displays an interface (for example, a chat interface of WeChat or a chat interface of messages) for chatting with a specified contact, when detecting an operation used to send an image, the mobile phone 100 displays an image suitable to be sent to the specified contact. For another example, if the mobile phone 100 detects that a scenic image is sent to a contact whose name remarks are "father" or "mother" for a relatively large quantity of times, the mobile phone 100 determines that an image suitable to be sent to "father" or "mother" is a scenic image, or if the mobile phone 100 learns that a portrait is sent to a contact whose name remarks are "Amy" for a relatively large quantity of times, the mobile phone 100 determines that an image suitable to be sent to Amy is a portrait. When the mobile phone 100 displays an interface for chatting with "father" or "mother" or a group including "father" and/or "mother", when the mobile phone 100 detects an operation used to send an image, the mobile phone 100 may display a thumbnail of an image suitable to be sent to "father" or "mother".

Figure 4B:
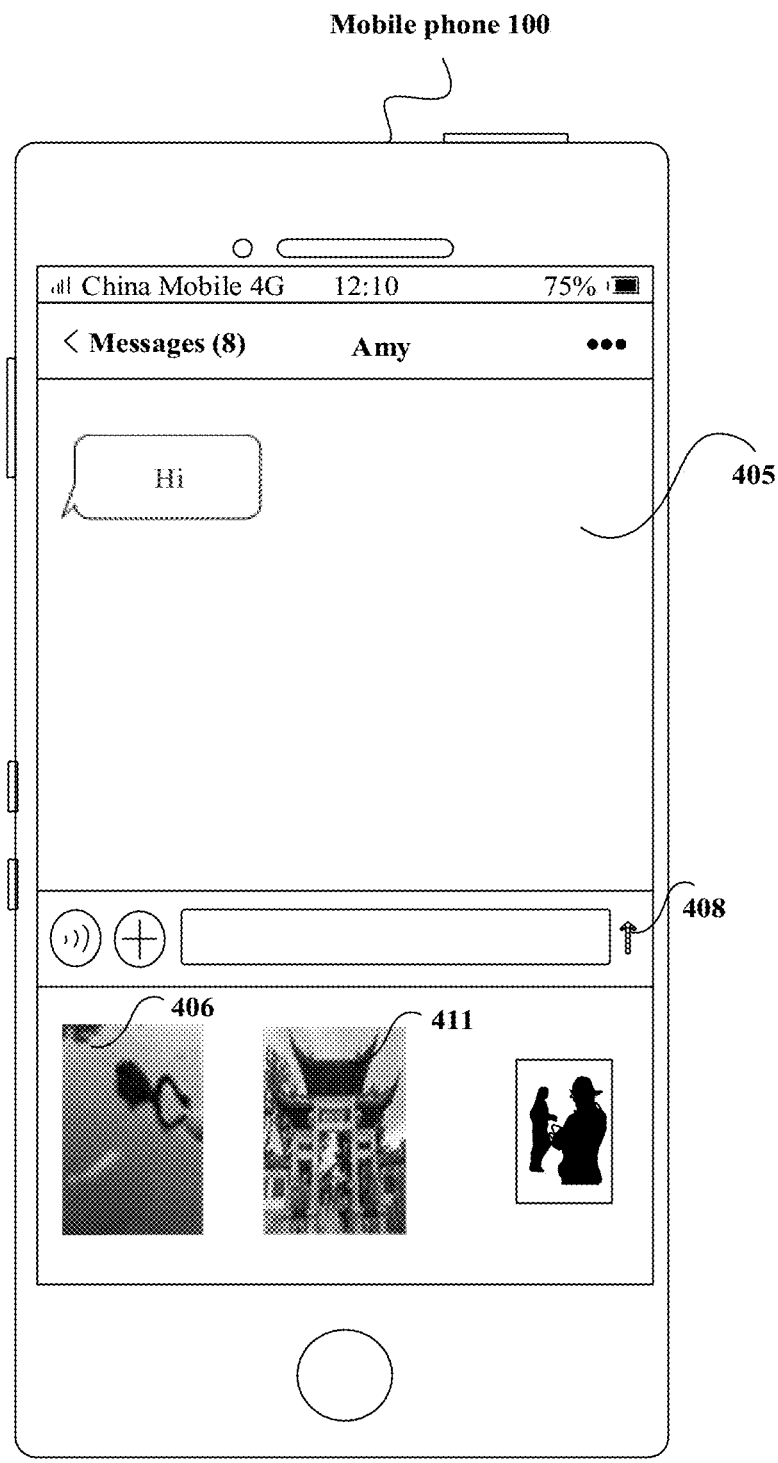
FIG. 4B (a) to FIG. 4B (d) are schematic diagrams of graphical user interfaces of a mobile phone 100 according to an embodiment of this application.
Figure 4B:
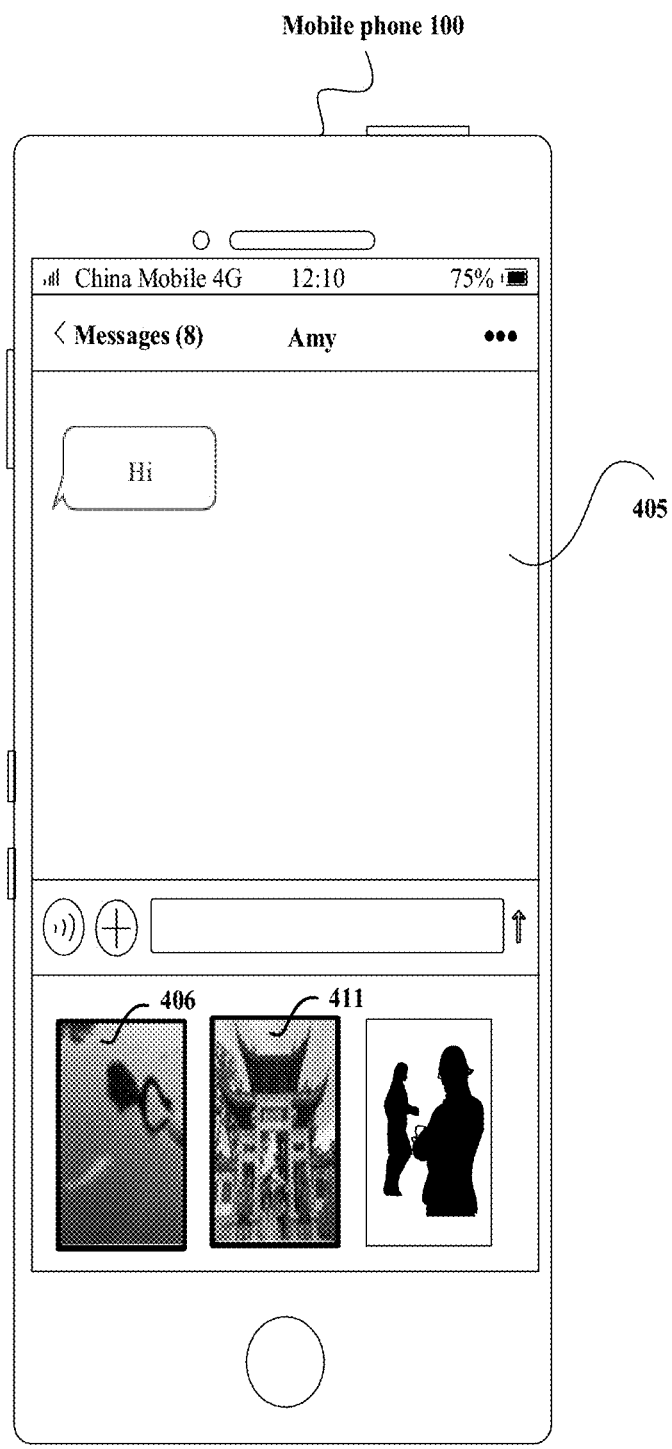
Figure 4B:
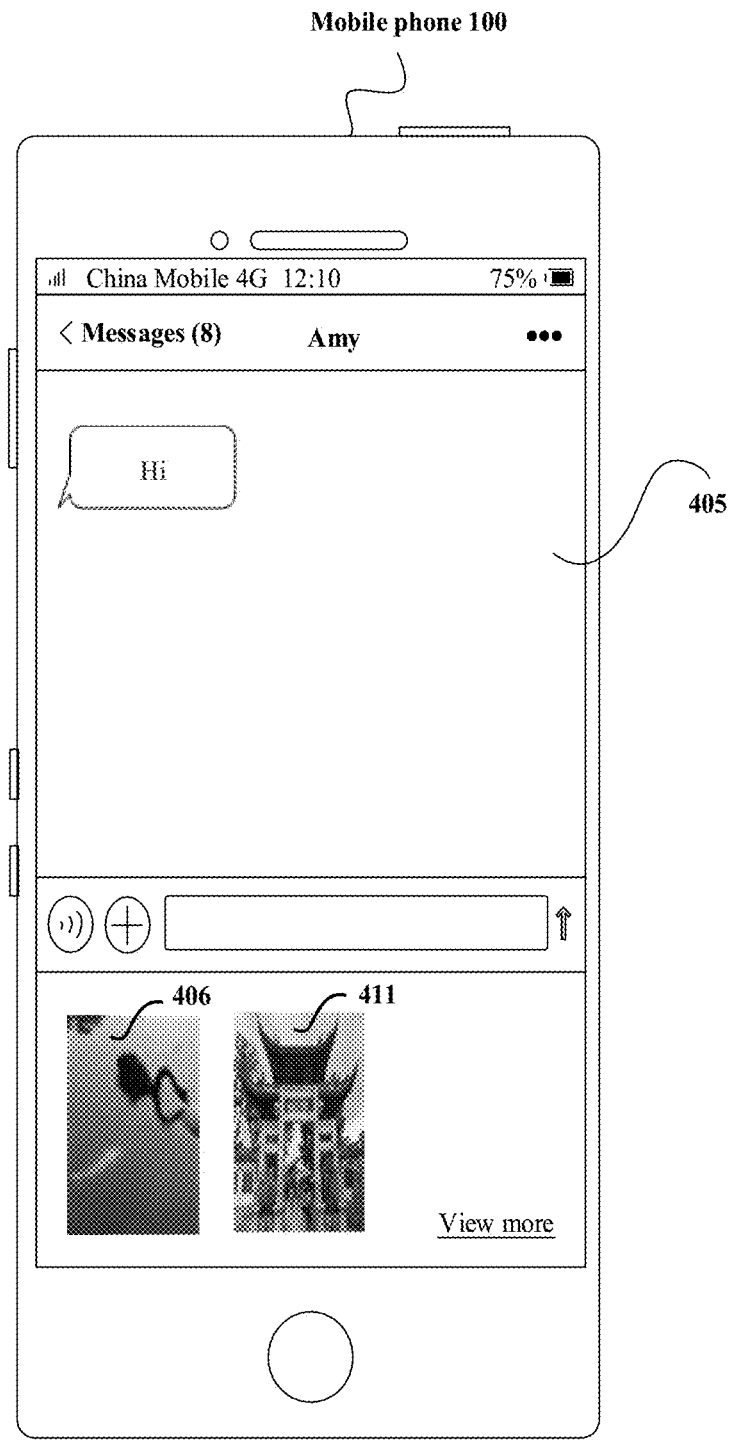
Figure 4B:
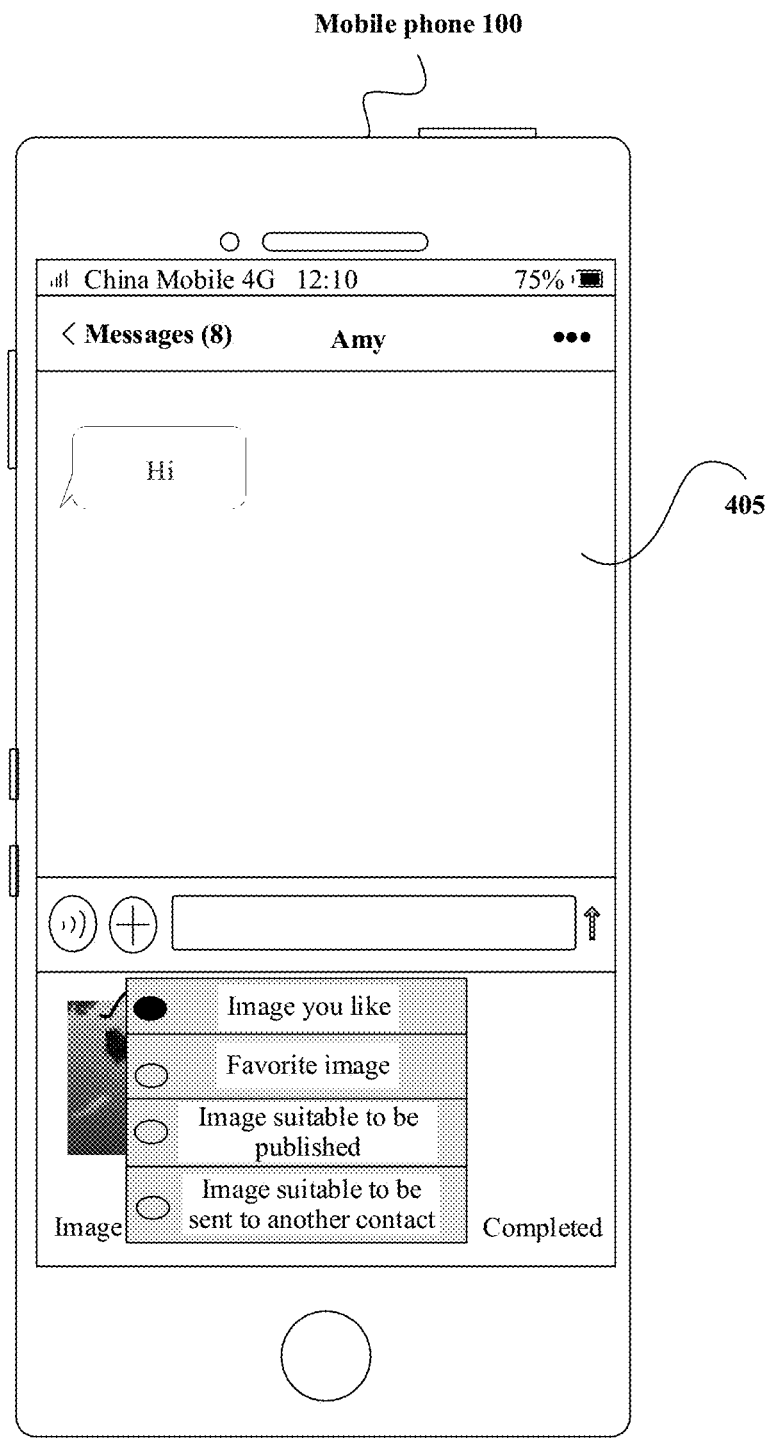

In other examples, as shown in FIG. 4B (a), in the interface 405, a size of a thumbnail (for example, the image 406 and the image 411) of an image of "you like" or an image of "suitable to be sent to another contact" is greater than a size of a thumbnail of another image.

For another example, as shown in FIG. 4B (b), in the interface 405, an edge of a thumbnail (the image 406 and the image 411) of an image of "you like" or an image of "suitable to be sent to another contact" is bold, and an edge of another image is bold.

For another example, as shown in FIG. 4B (c), the interface 405 includes only thumbnails of two images. The two images are images of "you like" or images of "suitable to be sent to another contact" or an image of "you like" and an image of "suitable to be sent to another contact" selected by the mobile phone 100 from a large quantity of images in a gallery. In this example, the interface 405 does not include another image. Certainly, still as shown in FIG. 4B (c), the interface 405 includes a "view more" control. When the mobile phone 100 detects an operation on the control, the mobile phone 100 displays more thumbnails.

For another example, as shown in FIG. 4B (d), the interface 405 includes an "image type" control. When the "image type" control is triggered, the mobile phone 100 displays a plurality of options, namely, an "image you like" option, a "favorite image" option, an "image suitable to be published" option, and an "image suitable to be sent to another contact" option. Assuming that the "image suitable to be sent to another contact" option is selected, the mobile phone 100 displays only an image suitable to be sent to another contact.

It should be understood that in FIG. 4A (a) to FIG. 4A (c), the messages application is used as an example. A similar manner may be used for another instant messaging application, and details are not described again.

It should be noted that in the embodiment shown in FIG. 4A (a) to FIG. 4A (c), when detecting an operation used to send an image to another contact, the mobile phone 100 may display an image of "suitable to be sent to another contact" or an image of "you like" or display different identification information for different types of images (for example, a first identifier is displayed for an image of "suitable to be sent to another contact", and a second identifier is displayed for an image of "you like"), so that the user quickly searches for an image. In addition, types of images are obtained by the mobile phone 100 by performing classification based on operation behaviors of the user on the images. Therefore, image type classification complies with an operation habit of the user, so that user experience is improved.

Scenario 4: Image Photographing

Figure 5A:
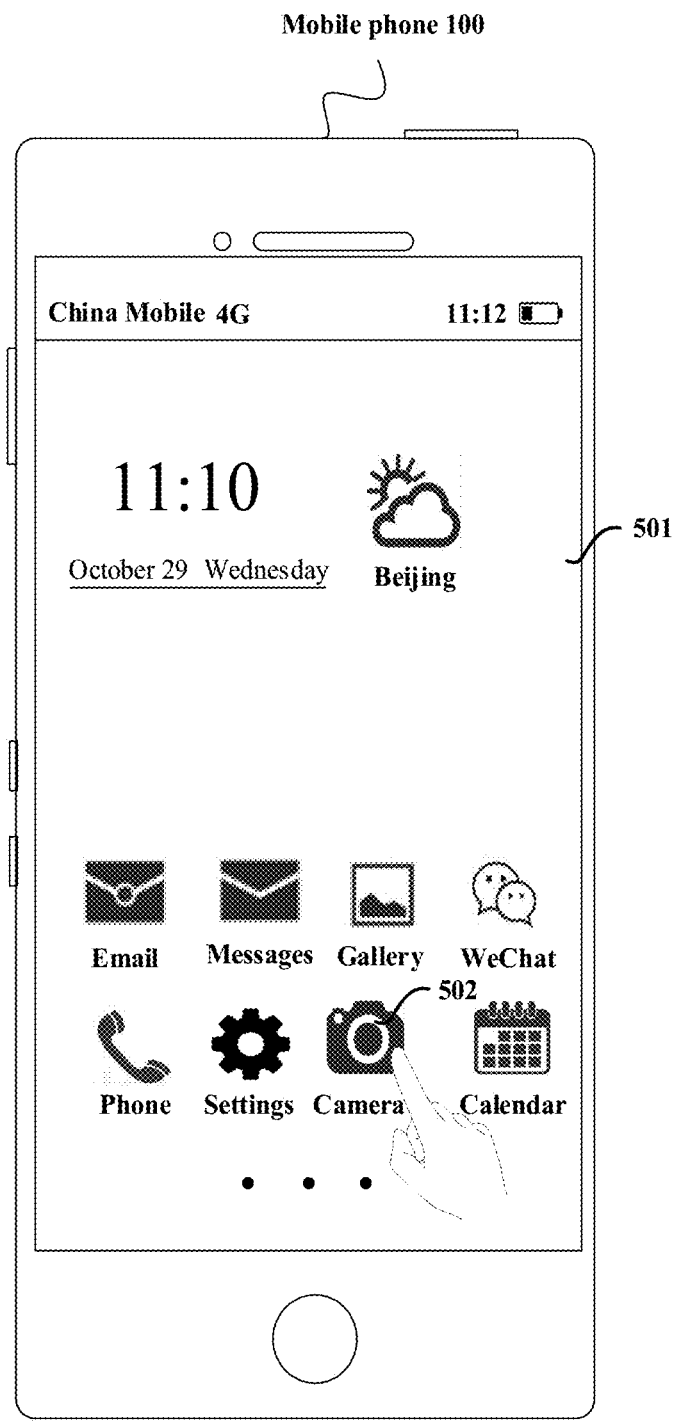
FIG. 5A (a) and FIG. 5A (b) are schematic diagrams of graphical user interfaces of a mobile phone 100 according to an embodiment of this application.
Figure 5A:
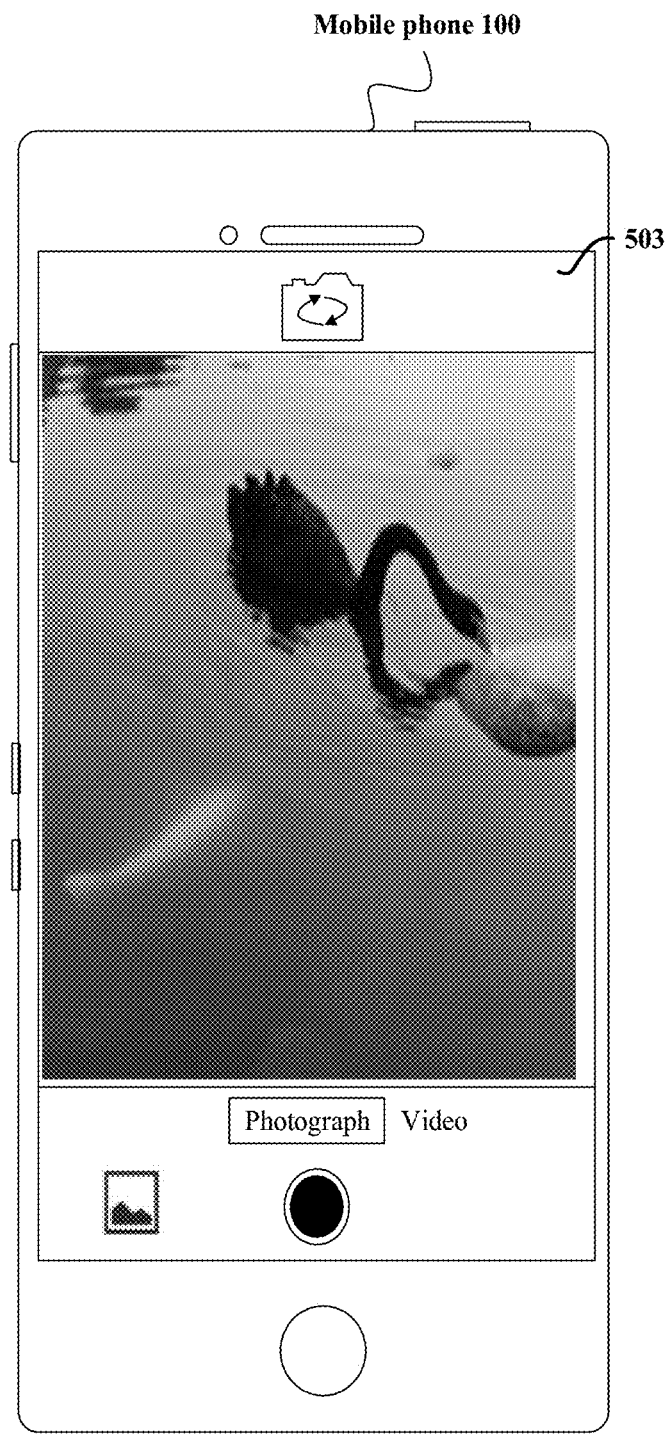

As shown in FIG. 5A (a), a mobile phone 100 displays a home screen 501, and the home screen 501 includes application icons of a plurality of applications. When the mobile phone 100 detects that a user triggers an icon 502 of a camera application, the mobile phone 100 displays an interface 503 of the camera application, as shown in FIG. 5A (b).

In an example, as shown in FIG. 5A (b), the interface 503 of the camera application includes a preview image. The preview image is an image captured by the mobile phone 100 based on a preset photographing parameter of the camera, and the preset photographing parameter may be a photographing parameter obtained by the mobile phone 100 through analysis based on an image the user likes. For example, if the mobile phone 100 learns that an image the user likes is relatively bright, the mobile phone 100 adjusts the photographing parameter of the camera, for example, increases an exposure value. Therefore, in this manner, after the mobile phone 100 starts the camera application, the mobile phone 100 captures an image by using the preset photographing parameter by default. In this way, the photographed image is more likely to be an image the user likes.

Figure 5B:
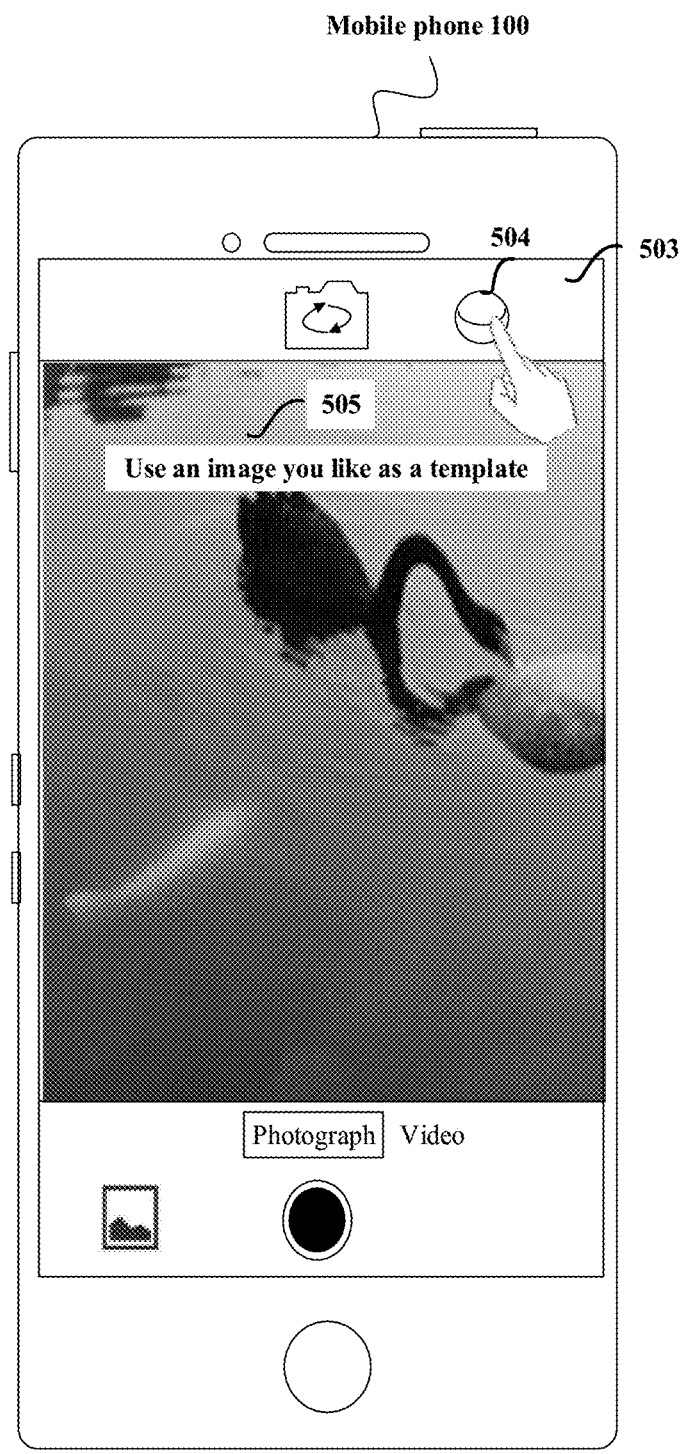
FIG. 5B (a) to FIG. 5B (c) are schematic diagrams of graphical user interfaces of a mobile phone 100 according to an embodiment of this application.
Figure 5B:
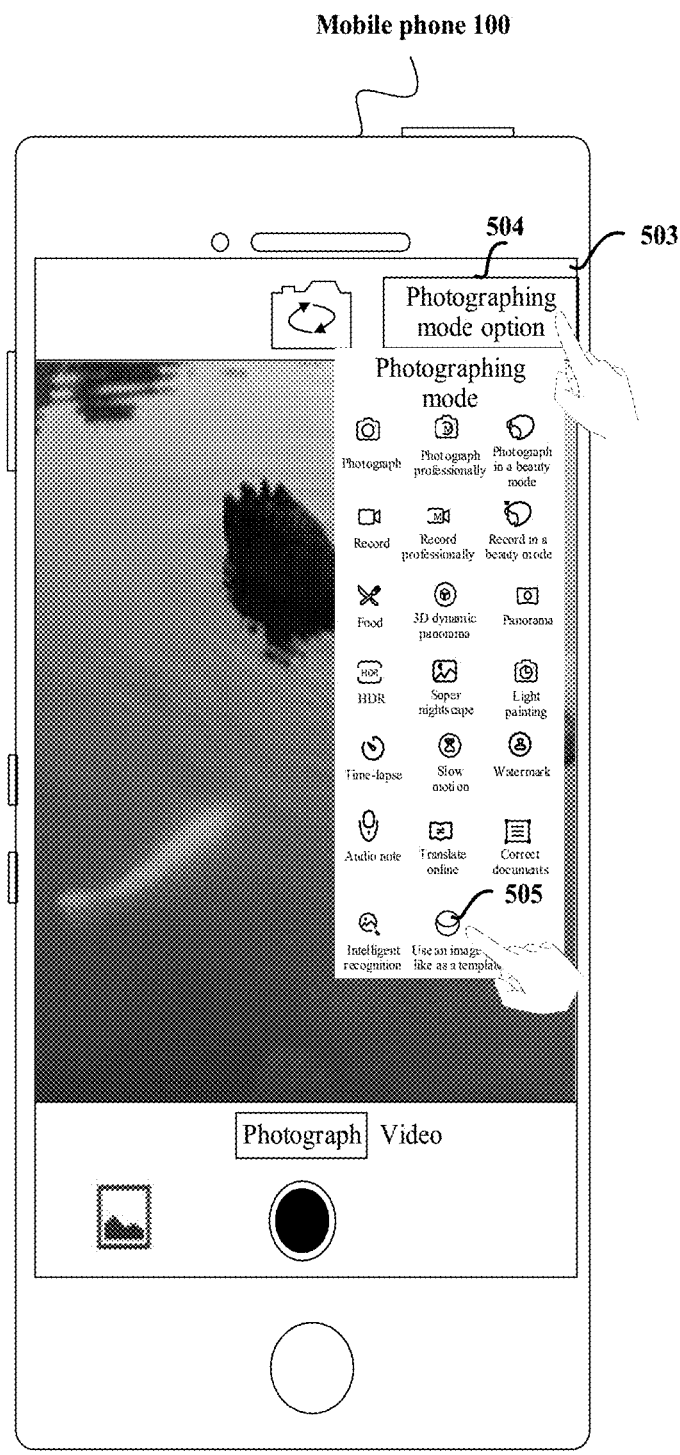
Figure 5B:
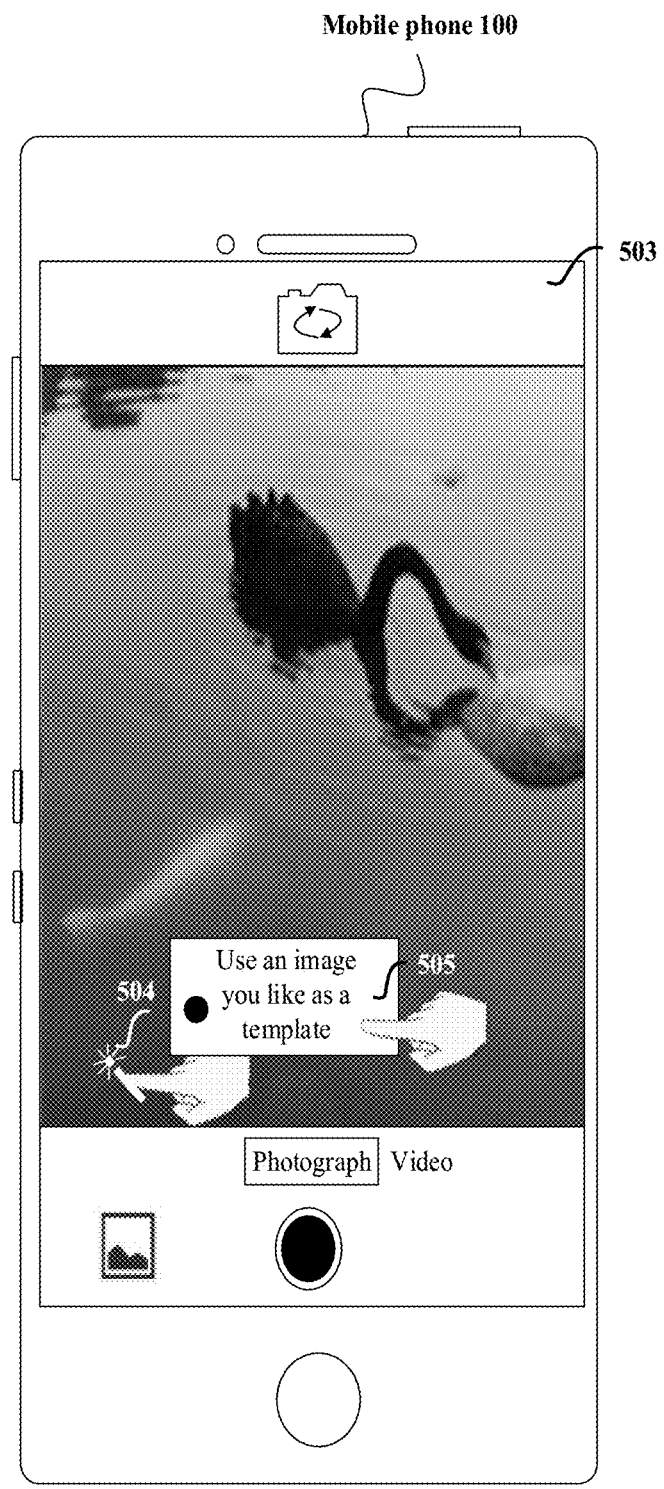

In another example, as shown in FIG. 5B (a), the interface 503 of the camera application includes a control 504. When the mobile phone 100 detects that the control 504 is triggered, prompt information 505 is displayed in the interface 503. The prompt information 505 is used to indicate, to the user, that the mobile phone 100 takes a photograph by using an image the user likes as a template. The mobile phone 100 adjusts a photographing parameter to a photographing parameter obtained through analysis based on an image the user likes.

In still another example, as shown in FIG. 5B (b), the interface 503 of the camera application includes a control 504. When the mobile phone 100 detects that the control 504 is triggered, a photographing mode selection box is displayed in the interface 503, and the photographing mode selection box includes controls corresponding to a plurality of photographing modes, including a "use an image you like as a template" control 505. When the mobile phone 100 detects that the control 505 is triggered, the mobile phone 100 adjusts a photographing parameter to a photographing parameter obtained through analysis based on an image the user likes.

In still another example, as shown in FIG. 5B (c), the interface 503 of the camera application includes a "glow stick" control 504. When the mobile phone 100 detects that the "glow stick" control 504 is triggered, the mobile phone 100 displays one or more options such as a "use an image you like as a template" option 505. When the mobile phone 100 detects that the option 505 is selected, the mobile phone 100 adjusts a photographing parameter to a photographing parameter obtained through analysis based on an image the user likes.

The following embodiment describes a process in which the mobile phone 100 classifies stored images into two image types of "you like" and "you dislike".

Figures 6, 7:
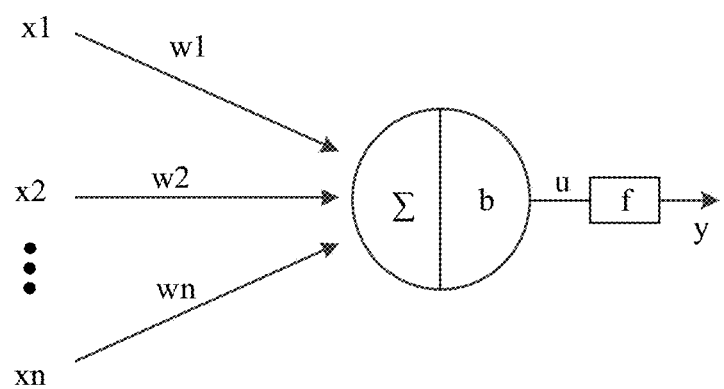
FIG. 6 is a schematic flowchart of an image classification method according to an embodiment of this application.
FIG. 7 is a schematic diagram of a model according to an embodiment of this application.

FIG. 6 is a schematic flowchart of image classification according to an embodiment of this application. As shown in FIG. 6, the process may include the following steps.

S601: A mobile phone 100 detects operation behaviors on images, where the operation behavior includes a behavior such as deleting, viewing, sharing, collecting, or editing the image.

Assuming that the mobile phone 100 stores a relatively large quantity of images, where some images are viewed by a user for a relatively large quantity of times, some images are edited (for example, are retouched by using retouching software), some images are to be deleted by the user or have not been viewed by the user for a long time, and the like, the mobile phone 100 may collect statistics on operation behaviors on all images.

For example, Table 1 is an example of operation behaviors, on the images, whose statistics are collected by the mobile phone 100.

TABLE 1

| Image identifier | Behavior |
| --- | --- |
| Image ID1 | View the image three times a day |
| Image ID2 | WeChat moment |
| Image ID3 | Delete |
| Image ID4 | View the image 0 times a day |

S602: The mobile phone 100 classifies the images into images of "you like" and images of "you dislike" based on the operation behaviors.

It should be understood that the mobile phone 100 classifies the images in a plurality of manners. For example, the mobile phone 100 may classify images in a gallery into images of "you like" and an image type of "you dislike" through artificial intelligence (artificial intelligence, AI) learning (for example, using an AI model), and then adds a "like" label to the images of "you like" and adds a "dislike" label to images of "you dislike".

For example, if the operation behavior is viewing, the mobile phone 100 may mark, as an image the user likes, an image that has been viewed for more than a preset quantity of times, and mark, as an image the user dislikes, an image that has been viewed for the preset quantity of times or less than the preset quantity of times. For example, if the operation behavior is sharing, the mobile phone 100 may mark, as an image the user likes, an image that has been shared for a preset quantity of times, and mark, as an image the user dislikes, an image that has been shared for the preset quantity of times or less than the preset quantity of times.

For example, Table 2 is an example of favorability that is of the user for each image and that is determined by the mobile phone 100.

TABLE 2

| Image identifier | Behavior | Favorability |
| --- | --- | --- |
| Image ID1 | View the image three times a day | Like |
| Image ID2 | Share the image on social software | Like |
| Image ID3 | Delete | Dislike |
| Image ID4 | View the image 0 times a day | Dislike |

It should be noted that the favorability may be indicated by "yes" or "no", where "yes" indicates "like", and "no" indicates "dislike"; or the favorability may be indicated by a score. A higher score indicates higher favorability, and a lower score indicates lower favorability. The score may be measured by using a 10-point scoring system, a 100-point scoring system, or the like, and this is not limited in this embodiment of this application.

The following embodiment describes a process in which the mobile phone 100 classifies images into image types of "you like" and "you dislike" by using an AI model.

In some embodiments, the model may be, for example, a neural network unit, a machine learning model, or the like. Generally, the model may include a model parameter. The mobile phone 100 may obtain an output result by using an input parameter, the model parameter, and a related algorithm. The output result may be a class label. FIG. 7 shows an example of an algorithm related to a model parameter:

$$\begin{cases} u = \sum_{i=1}^{n} w_i x_i + b \\ y = f(u) \end{cases} \quad (1)$$

where $x_1$ and $x_2$ to $x_n$ are a plurality of input parameters, $w_1$ and $w_2$ to $w_n$ are coefficients (also referred to as weights) of the input parameters, b is an offset (used to indicate an intercept between u and a coordinate origin) of each input parameter, and f is used to ensure that a value range of an output result is a function (for example, a Sigmoid function or a tan h function) in an interval [0, 1]. In some embodiments, an input parameter is x, model parameters are the weight $w_i$ and the offset b, and an output parameter is y. When w, b, and x have specific values, the output result y may be obtained by using the foregoing formula. It should be noted that FIG. 7 is only an example of a model for ease of understanding, and is not a limitation on the model of this application.

It should be understood that, in this embodiment of this application, the input parameter x is one or more images (referred to as input images below). When a model parameter is determined, an output result may be obtained by using a model related algorithm, and the output result may be class labels to which the one or more input images belong. For example, the class label may be "you like" or "you dislike". A model use process may be as follows: One or more images are used as input parameters, and a model parameter (for example, a trained model parameter) is used to run a model related algorithm to obtain an output result. The output result may be a label of the input image. For example, the output result is "yes" or "no". In some embodiments, the output result may be obtained based on a probability that the input image belongs to a "like" label (or a probability that the input image belongs to a "dislike" label). For example, when a probability that an image belongs to the "like" label is 0.9, the mobile phone 100 may determine that the input image belongs to the "you like" class label, and the output result may be "yes".

Figure 8:
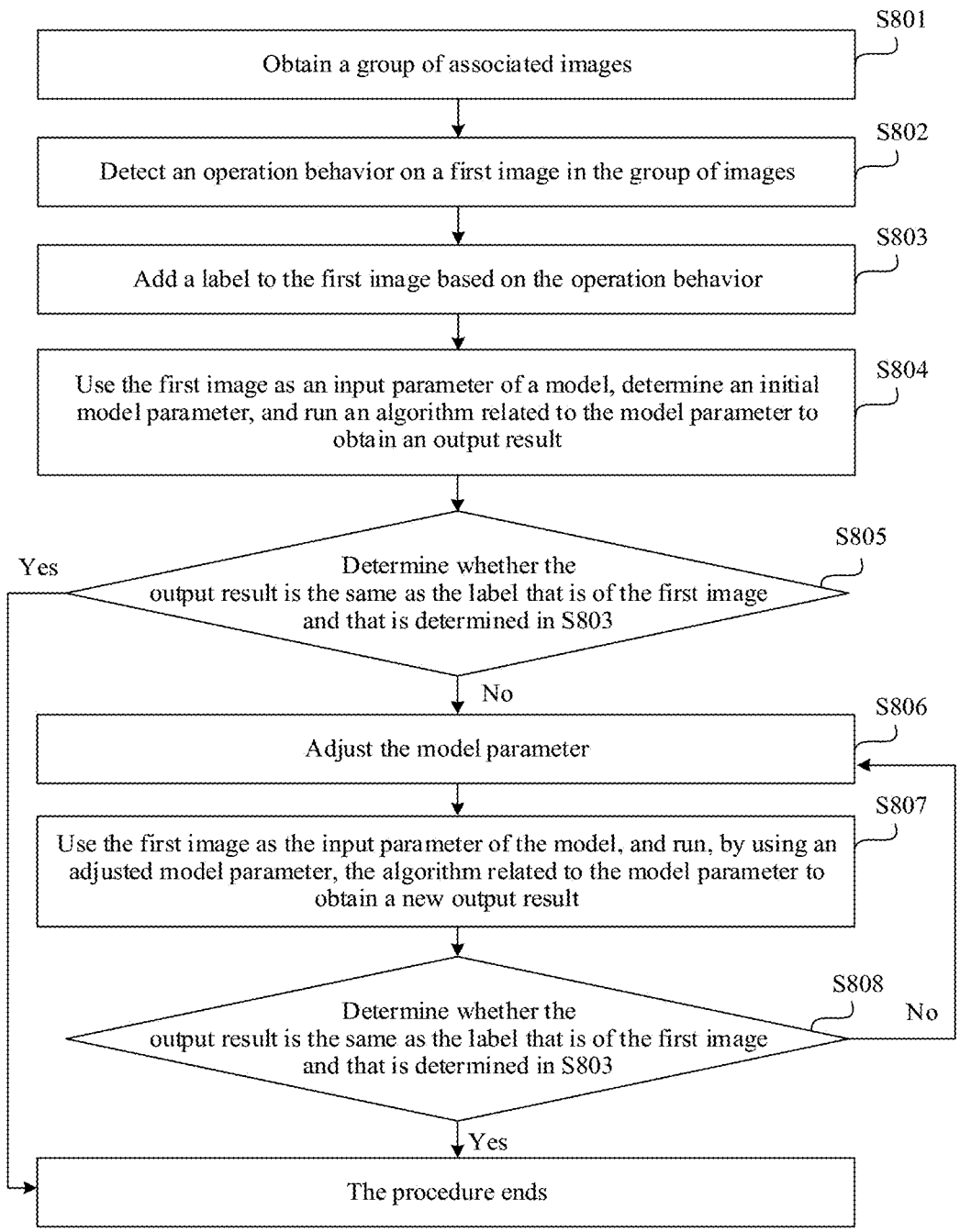
FIG. 8 is a schematic flowchart of model training according to an embodiment of this application.

It should be noted that there is a "training process" and a "use process" for using a model. The model training process is a process of determining a model parameter. The following embodiment describes the model training process. Refer to FIG. 8. A procedure of the model training process may include the following steps.

S801: Obtain a group of associated images.

In some embodiments, a group of "associated" images may be at least two images, and "associated" may mean that a group of images are associated in terms of content, photographing times, photographing places, or the like. In an example, if a mobile phone 100 continuously photographs three images, the three images are a group of associated images. In other examples, the mobile phone 100 photographs three images of a same object, in other words, the three images include the same object (which may also be referred to as a photographed object), the three images are also a group of associated images. In still another example, the mobile phone 100 photographs three images within specific duration (for example, within 30 minutes), the three images may be a group of associated images.

S802: Detect an operation behavior on a first image in the group of images.

A user may perform different operations on images in a group of associated images. For example, a group of associated images include three images including a same person. When the mobile phone 100 detects an image publishing operation on one of the images (for example, publishing the image to Moments of WeChat), the mobile phone 100 determines that the image belongs to an image type of "suitable to be published". The mobile phone 100 may add a label such as a "suitable to be published" label to the image.

S803: Add a label to the first image based on the operation behavior.

It should be understood that the mobile phone 100 may determine an image type of an image in a group of associated images based on an operation behavior of the user on the image, and further add a suitable label to the image.

S804: Use the first image as an input parameter, determine an initial model parameter, and run an algorithm related to the model parameter to obtain an output result, where the output result may be the label of the first image.

S805: Determine whether the output result is the same as the label that is of the first image and that is determined in S803; and if yes, end the training; or if no, perform S806.

S806: Adjust the model parameter.

S807: Use the first image as the input parameter, and run, by using an adjusted model parameter, an algorithm related to the model parameter to obtain a new output result.

Taking FIG. 7 as an example, a model training process is a process of determining $w_i$ and b when $x_i$ and y are known. In some embodiments, when $x_i$ is known, initial $w_0$ and $b_0$ are determined, Formula (1) is calculated to obtain $y_0$, and it is determined, through comparison, whether a difference between $y_0$ and known y is relatively small. If yes, the model training is completed. If no, initial $w_0$ and $b_0$ are adjusted, for example, adjusted to $w_1$ and $b_1$, then Formula (1) is calculated again to obtain $y_1$ when $x_i$, $w_1$, and $b_1$ are known, and a difference between $y_1$ and known y is determined through comparison. The model training ends until a difference between obtained $y_n$ and known y is relatively small.

S808: Determine whether the output result is the same as the label that is of the first image and that is determined in S803; and if yes, end the training; or if no, perform S806.

For example, the mobile phone 100 photographs two associated images. The mobile phone 100 detects that the user publishes the first image to Moments, but does not publish the second image. In this case, a label of the first image is "image you like", and a label of the second image is "image you dislike". The mobile phone 100 uses the first image as a positive training set, and uses the second image as a negative training set.

The mobile phone 100 uses the first image and the second image as input parameters, and runs a model related algorithm by using a model parameter to obtain a first output result and a second output result. If the first output result indicates that the first image is an image the user likes, and the second output result indicates that the second image is an image the user dislikes, in other words, the first output result is consistent with the label of the first image, and the second output result is consistent with the label of the second image, the mobile phone 100 does not need to adjust the model parameter. When the first output result is inconsistent with the label of the first image, or the second output result is inconsistent with the identifier of the second image, the model parameter is adjusted until the first output result is consistent with the label of the first image, and the second output result is consistent with the identifier of the second image, in other words, the model training ends.

In the foregoing process, a label used in the model training process of the mobile phone 100 is "image you like" or "label you dislike", and therefore a trained model parameter is used to classify images into a type of "you like" and a type of "you dislike". In some embodiments, one or more models may be stored in the mobile phone 100, and if a plurality of models are stored, the models may have different functions. For example, one model is used to classify images into a type of "you like" or "you dislike", and another model is used to classify images into a type of "suitable to be published" or "unsuitable to be published".

In some embodiments, after the model training ends, a model use process includes: The mobile phone 100 uses one or more images as input parameters of a model, and when model parameters (which are determined in the model training process, and are, for example, $w_i$ and b) are known, runs a model related algorithm to determine an output result. The output result is class labels of the one or more input images.

In some embodiments, the mobile phone 100 may periodically train a model or classify images by using a model, or may train a model or classify images by using a model when the mobile phone 100 is idle (for example, the user has not operated the mobile phone 100 for a relatively long time). This is not limited in this embodiment of this application.

The following describes some examples in which the mobile phone 100 classifies images into "you like" or "you dislike" by using an AI model.

EXAMPLE 1

Figure 9A:
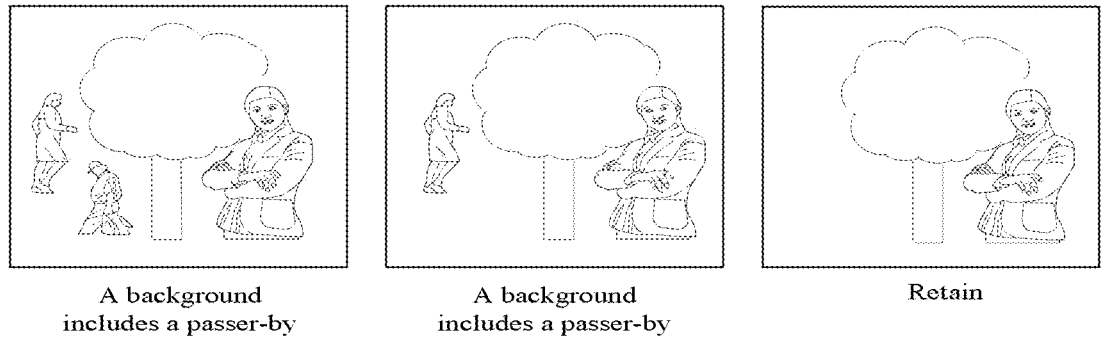
FIG. 9A is a schematic diagram of graphical user interfaces of a mobile phone 100 according to an embodiment of this application.

A mobile phone 100 photographs three images. As shown in FIG. 9A, a user deletes the first two images, and retains the third image (or a user views the third image for a relatively large quantity of times, and views the first two images for a relatively small quantity of times, or the third image is modified (for example, retouched), and the first two images are not modified, or the like). The mobile phone 100 detects different operation behaviors of the user on the three images, and may determine that the user likes the third image, and then use the first two images as a positive training set and use the third image as a negative training set to train an AI model to obtain a trained model. Based on the trained model, an image whose image background includes a relatively small quantity of persons may be classified as an image the user likes, and an image whose image background includes a relatively large quantity of persons may be classified as an image the user dislikes.

If the mobile phone 100 photographs an image again, the mobile phone 100 may input the image into the AI model, and run the AI model to perform calculation. If it is determined that a background of the image includes a relatively small quantity of persons, a result "yes" is output, or if a background of the image includes a relatively large quantity of persons, a result "no" is output, where "yes" is used to indicate that the user likes the image, and "no" is used to indicate that the user dislikes the image.

Optionally, for an image the user likes, the mobile phone 100 displays an identifier on a thumbnail of the image. For an image whose output result is "no", the mobile phone 100 may output prompt information to indicate the user to delete the image.

EXAMPLE 2

Figure 9B:
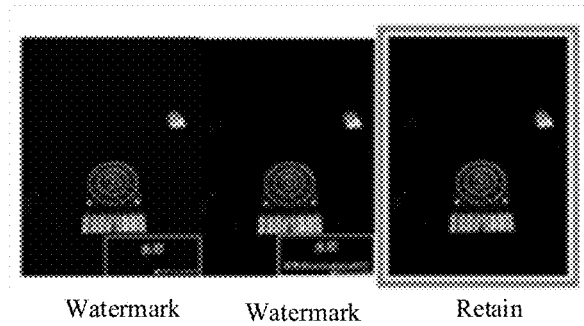
FIG. 9B is a schematic diagram of graphical user interfaces of a mobile phone 100 according to an embodiment of this application.

A mobile phone 100 photographs three images. As shown in FIG. 9B, a user deletes the first two images, and retains the third image. The mobile phone 100 detects different operation behaviors of the user on the three images, and may determine that the user likes the third image, and then use the first two images as a positive training set and use the third image as a negative training set to train an AI model to obtain a trained model. Based on the trained model, an image including no watermark may be classified as an image the user likes, and an image including a watermark may be classified as an image the user dislikes.

After the mobile phone 100 photographs an image again, the mobile phone 100 inputs the image into the AI model, and runs the AI model to perform calculation. If it is determined that the image includes no watermark, a result "yes" is output, or if the image includes a watermark, a result "no" is output, where "yes" is used to indicate that the user likes the image, and "no" is used to indicate that the user dislikes the image.

EXAMPLE 3

Figure 9C:
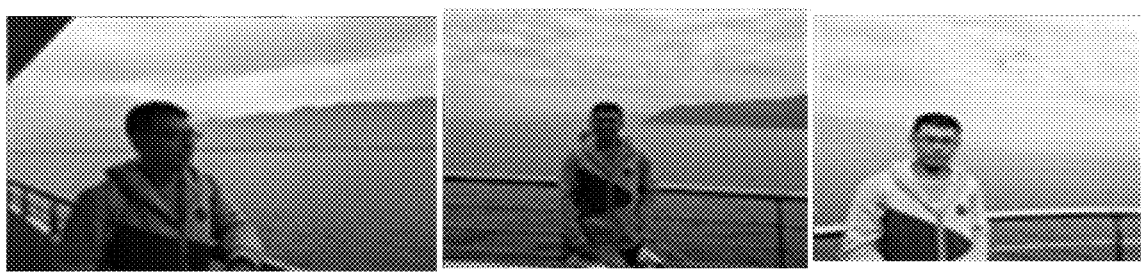
FIG. 9C is a schematic diagram of graphical user interfaces of a mobile phone 100 according to an embodiment of this application.

A mobile phone 100 photographs three images. As shown in FIG. 9C, a user deletes the first two images, and retains the third image. The mobile phone 100 detects different operation behaviors of the user on the three images, and may determine that the user likes the third image, and then use the first two images as a positive training set and use the third image as a negative training set to train an AI model to obtain a trained model. Based on the trained model, an image on which there is a shadow on a face of a person may be classified as an image the user likes, and an image on which there is no shadow on a face of a person may be classified as an image the user dislikes.

After the mobile phone 100 photographs an image again, the mobile phone 100 inputs the image into the AI model, and runs the AI model to perform calculation. If it is determined that there is no shadow on a face of a person on the image, a result "yes" is output, or if there is a shadow on a face of a person on the image, a result "no" is output, where "yes" is used to indicate that the user likes the image, and "no" is used to indicate that the user dislikes the image.

EXAMPLE 4

Figure 9D:
FIG. 9D is a schematic diagram of graphical user interfaces of a mobile phone 100 according to an embodiment of this application.

A mobile phone 100 photographs three images. As shown in FIG. 9D, a user deletes the first two images, and retains the third image. The mobile phone 100 detects different operation behaviors of the user on the three images, and may determine that the user likes the third image, and then use the first two images as a positive training set and use the third image as a negative training set to train an AI model to obtain a trained model. Based on the trained model, an image with moderate brightness and relatively high definition may be classified as an image the user likes, and an excessively bright or dim image with relatively low definition may be classified as an image the user dislikes.

After photographing an image again, the mobile phone 100 inputs the image into the AI model, and runs the AI model to perform calculation. If it is determined that the image has relatively high definition and moderate brightness, a result "yes" is output, or if the image is relatively bright or relatively dim and has relatively low definition, a result "no" is output, where "yes" is used to indicate that the user likes the image, and "no" is used to indicate that the user dislikes the image.

EXAMPLE 5

A selfie is used as an example. A person always takes selfies at a plurality of angles. For example, a face turns to the left by 60°, the face turns to the left by 30°, the face faces the front, the face turns to the right by 30°, and the face turns to the right by 60°. Generally, after photographing a plurality of images, the user performs screening to retain a selected image and delete another images, or the user may share, collect, or repeatedly view an image, or the like. When detecting different operation behaviors of the user on the plurality of images, a mobile phone 100 may determine an image the user likes (for example, determine that a shared image, a retained image, or a collected image is an image the user likes). For example, the mobile phone 100 determines, through AI learning, that a face angle on the image the user likes is usually 60 degrees by which the face turns to the left.

When the user takes a selfie again by using the mobile phone 100, if the mobile phone 100 determines that a face angle on the image is 60 degrees by which the face turns to the left, the mobile phone 100 may advise the user to retain the image (or may indicate, to the user, that the image can be shared). If the mobile phone 100 determines that a face angle on the image is not 60 degrees by which the face turns to the left, the mobile phone 100 may indicate the user to delete the image.

Example 5 merely uses a face angle in a selfie as an example. In an actual application, the mobile phone 100 may further learn a facial expression, a posture, a position in a group photo, and the like in an image the user likes. It is assumed that the facial expression is a smile, the posture is standing, or the user is in a middle position on the image the user likes. After the mobile phone 100 photographs an image, if it is determined that a facial expression on the image is a smile, a posture is standing, or the user is in a middle position, the mobile phone 100 retains the image (or may indicate, to the user, that the image can be shared, or the like).

The foregoing lists four processes in which the mobile phone 100 learns, based on operation behaviors of the user on images, images belonging to a type of "you like". In an actual application, the mobile phone 100 may perform learning based on any one or more of the foregoing manners, and this is not limited in this embodiment of this application.

It should be noted that, when identifying an image of "you dislike" by using the AI model, the mobile phone 100 may output prompt information to indicate the user to delete the image, or automatically delete the image. Alternatively, after detecting that images are backed up to the cloud, the mobile phone 100 automatically deletes all images whose labels are "you dislike". Alternatively, after detecting that images are backed up to the cloud, the mobile phone 100 outputs prompt information to indicate, to the user, whether to delete an image whose label is "you dislike". Alternatively, after detecting that images are backed up to the cloud, the mobile phone 100 displays a control, and when the control is triggered, the mobile phone 100 deletes all images whose labels are "you dislike".

The following embodiment describes a process in which the mobile phone 100 classifies images into "suitable to be published" and "unsuitable to be published".

Similarly, the mobile phone 100 may determine, by using an AI model, images belonging to "suitable to be published" and images belonging to "unsuitable to be published".

The mobile phone 100 detects first feature information of a published image in stored images. When obtaining an image, the mobile phone 100 determines whether second feature information of the image meets the first feature information. If the second feature information meets the first feature information, the mobile phone 100 adds a "suitable to be published" label to the image; or if the second feature information does not meet the first feature information, the mobile phone 100 adds an "unsuitable to be published" label to the image. For example, the mobile phone 100 detects that a scenic image in stored images is published. After the mobile phone 100 obtains an image, if the image is a scenic image, the mobile phone 100 adds the "suitable to be published" label to the image.

It should be noted that, in this embodiment of this application, the label may be alternatively "you like and suitable to be published", "you like but unsuitable to be published", "you dislike but suitable to be published", or "you dislike and unsuitable to be published". In other words, when a label of an image is identified by using a model, a plurality of types of the image may be identified. This is not limited in this embodiment of this application.

When detecting an operation used to publish an image, the mobile phone 100 recommends an image whose label is "suitable to be published" to a user. Taking FIG. 3A (b) as an example, when detecting an operation of triggering the "select an image from the gallery" option 304 by the user, the mobile phone 100 displays thumbnails of a plurality of images. Marks are displayed on thumbnails of some images, and the mark is used to indicate that the image belongs to an image type of "suitable to be published".

The following describes examples in which the mobile phone 100 classifies images into "suitable to be published" or "unsuitable to be published".

EXAMPLE 6

Three images are stored in a mobile phone 100, the first two images are published (or have been published for a relatively large quantity of times), and the third image is not published (or has been published for a relatively small quantity of times). The mobile phone 100 detects different operation behaviors of a user on the three images, and may determine that the first two images are images suitable to be published and the third image is not published or shared, and then use the first two images as a positive training set and use the third image as a negative training set to train an AI model to obtain a trained model. Based on the trained model, the mobile phone 100 may determine whether an input image meets a condition of being suitable to be published (for example, whether the input image meets feature information of a published image). If the input image meets the condition, the mobile phone 100 classifies the image under the "suitable to be published" class label; or if the input image does not meet the condition, the mobile phone 100 classifies the image under the "unsuitable to be published" class label.

After photographing an image again, the mobile phone 100 inputs the image into the AI model, and runs the AI model to perform calculation. If it is determined that the image meets the condition of being suitable to be published, the mobile phone 100 outputs a result "yes"; or if the image does not meet the condition of being suitable to be published, the mobile phone 100 outputs a result "no".

EXAMPLE 7

In some embodiments, a mobile phone 100 may divide a moving image into a plurality of static images at a time interval of 100 ms (the value is used as an example, and this is not limited in this embodiment of this application), and input each static image into an AI model to obtain an output result of each image, for example, a probability that each image belongs to a "you like" class label. The mobile phone 100 selects, from the static images, an image with a highest probability as a cover of the moving image.

The following describes a process in which the mobile phone 100 classifies images into "suitable to be sent to a contact" and "unsuitable to be sent to a contact".

Similarly, the mobile phone 100 may determine, by using an AI model, images belonging to "suitable to be sent to a contact" and images belonging to "unsuitable to be sent to a contact".

In some embodiments, the mobile phone 100 detects first feature information of an image that is in stored images and that is sent to one or more contacts (which may be any contact). When obtaining an image, the mobile phone 100 determines whether second feature information of the image meets the first feature information. If the second feature information meets the first feature information, the mobile phone 100 adds a "suitable to be sent to a contact" label to the image; or if the second feature information does not meet the first feature information, the mobile phone 100 adds an "unsuitable to be sent to a contact" label to the image. For example, the mobile phone 100 detects that an image obtained by the mobile phone by taking a screenshot in stored images is sent to a contact. After the mobile phone 100 obtains an image, if the image is an image obtained by the mobile phone 100 by taking a screenshot, the mobile phone 100 adds the "suitable to be sent to a contact" label to the image.

When detecting an operation used to send an image to another contact, the mobile phone 100 recommends an image whose label is "suitable to be sent to a contact" to a user. Taking FIG. 4A (a) as an example, when detecting an operation of triggering the image 403 by the user, the mobile phone 100 displays a plurality of images. Icons are displayed on thumbnails of some images, and the icon is used to indicate that the image is suitable to be sent to a contact.

In other embodiments, the mobile phone 100 may further determine, by using the AI model, images belonging to "suitable to be sent to a specified contact". The specified contact may include a specified type of contact, a certain specified contact, or the like. The specified type of contact may be contacts belonging to a same group. Taking a WeChat application as an example, the specified type of contact may be all contacts belonging to a same WeChat chat group in the WeChat application, all contacts belonging to a same group in the WeChat application, or all contacts whose name remarks include a common word (for example, teacher) in the WeChat application. The certain specified contact may be a specific contact, and the electronic device may determine, based on name remarks of a contact, whether the contact is a specified contact. For example, the mobile phone 100 may detect first feature information of an image sent to a specified contact (for example, a parent) in all stored images. When obtaining an image, the mobile phone 100 determines whether second feature information of the image meets the first feature information. If the second feature information meets the first feature information, the mobile phone 100 adds a "suitable to be sent to a specified contact" label to the image.

The implementations of this application may be combined randomly to achieve different technical effects.

Figure 10:
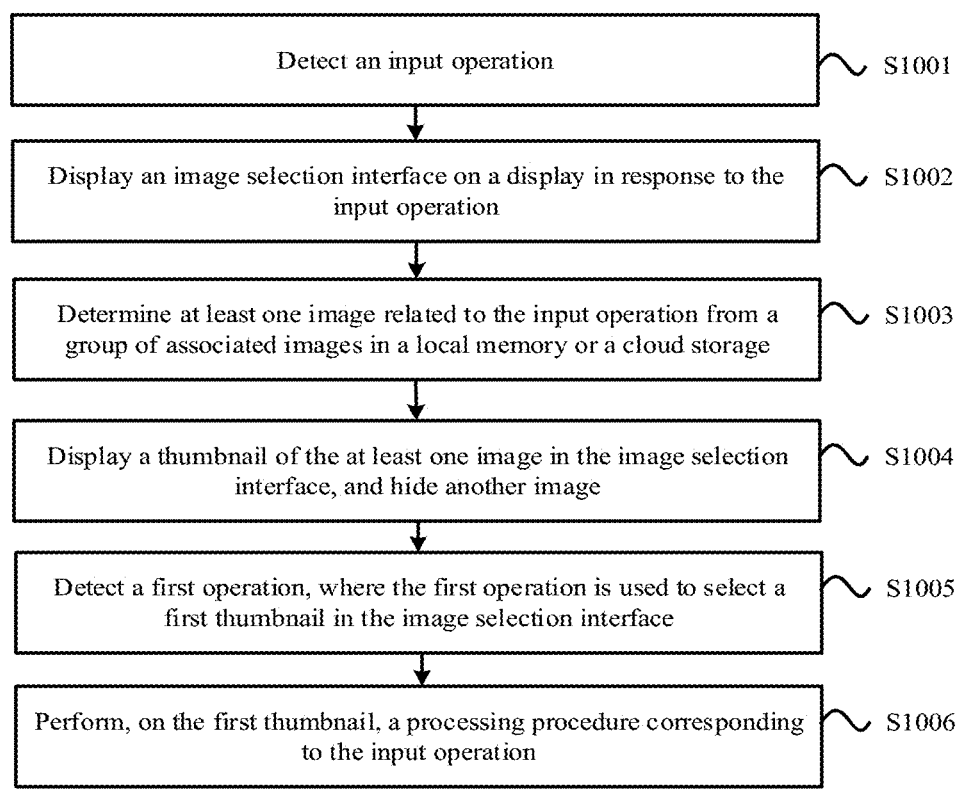
FIG. 10 is a schematic flowchart of an image display method according to an embodiment of this application.

With reference to the foregoing embodiments and related accompanying drawings, an embodiment of this application provides an image display method. The method may be implemented in the mobile phone 100 shown in FIG. 1A or another electronic device. As shown in FIG. 10, the method may include the following steps.

1001: Detect an input operation.

In an example, taking FIG. 3A (b) as an example, the input operation may be an operation of tapping the "select an image from the gallery" control 304.

1002: Display an image selection interface on a display in response to the input operation.

In some embodiments, the image selection interface (which may also be referred to as an interface for selecting an image) is an interface that can display thumbnails of a plurality of images for selection by a user, for example, the interface 203 in FIG. 2B (a) to FIG. 2B (d) or the interface 305 in FIG. 3B (a) to FIG. 3B (e).

1003: Determine at least one image related to the input operation from a group of associated images in a local memory or a cloud storage.

In some embodiments, the local memory may be a memory inside the electronic device. An image in the cloud storage may be an image stored on a cloud server by the electronic device.

In some embodiments, the group of associated images include a group of images including a same photographed object, for example, three images shown in FIG. 9C, and/or a group of images whose photographing time difference is less than a preset time difference, and/or a group of images photographed at a same place, and/or a group of images belonging to a same album, and/or a group of images including same content but having different resolution, and/or a group of images obtained after a same image is retouched in different manners.

In some embodiments, the electronic device may determine an image type of each image based on an operation behavior of the user on the image. For example, the electronic device obtains a group of associated images, detects an operation behavior on each of the group of images, where the operation behavior includes one or more of deleting, retaining, retouching, image publishing, and sending an image to a contact, and determines an image type of each image based on the operation behavior. The image type includes an image type of "suitable to be published" and an image type of "suitable to be sent to another contact".

For example, if the electronic device obtains the three images shown in FIG. 9C, and determines that the third image in the images is published on a social platform, the electronic device determines that the third image belongs to the type of "suitable to be published".

For another example, if the electronic device obtains three images shown in FIG. 9A, and determines that the third image in the images is sent to another contact, the electronic device determines that the third image belongs to the type of "suitable to be sent to another contact".

In a possible implementation, the electronic device may determine an operation type of the input operation, and determines, based on the operation type, at least one image associated with the operation type. In an example, the electronic device determines that the input operation is an operation used to publish an image, and determines, based on the operation type, at least one image suitable to be published. In other words, after detecting the operation used to publish an image, the electronic device may display only a thumbnail of the determined image suitable to be published, to help the user perform selection. In other examples, the electronic device determines that the input operation is an operation of communicating with another contact, and determines, based on the operation type, at least one image suitable to be sent to another contact. In other words, when detecting the operation used to send an image to another contact, the electronic device may display only a thumbnail of the image suitable to be sent to another contact, to help the user have a view.

In some embodiments, the at least one image suitable to be published may include at least one image that has been published, and may further include an image of a same type as the image that has been published. For example, if the at least one image that has been published is a portrait (for example, an area of a person on the image is relatively large), an image of a portrait type is an image suitable to be published. For another example, if the at least one image that has been published is an image on which leg extension processing is performed, the electronic device determines that an image on which leg extension processing is performed is an image suitable to be published. The at least one image suitable to be published may further include at least one image that has been retouched for a preset quantity of times.

In some embodiments, the at least one image suitable to be sent to another contact includes an image including the another contact, and may further include an image of a same type as an image that has been sent to the another contact. For example, if an image that has been sent to a contact is a mobile phone screenshot, an image obtained by the mobile phone by taking a screenshot is an image suitable to be sent to the contact.

In another possible implementation, the electronic device determines related information of an application to which the input operation relates, and determines, based on the related information of the application, at least one image associated with the related information of the application.

In an example, the electronic device may determine a type or a function of the application to which the input operation relates, and determine, based on the type or the function of the application, at least one image matching the type or the function.

For example, if the application to which the input operation relates is the Baihe Network, the electronic device determines that at least one image matching the application is at least one selfie. For another example, if the application to which the input operation relates is a game application, the electronic device determines that at least one image matching the application is an image of at least one game image.

In other examples, the electronic device may alternatively determine a historical record of publishing or sharing an image by the application to which the input operation relates, and determine, based on the historical record of the application, at least one image matching the historical record.

For example, if the electronic device detects that an image published by the user last time through Moments of WeChat is from a "My" album, the electronic device determines, based on the historical record, that the at least one image is at least one image in the "My" album.

In another possible case, the electronic device may alternatively determine time information corresponding to the input operation, and determine, based on the time information, at least one image matching the time information. The time information may include date information, moment information (for example, 12:10), and the like.

For example, if the electronic device determines that current time information is May 1, the electronic device may determine that at least one image corresponding to the time information is at least one image photographed on May 1, at least one image published/shared on May 1 last year, or at least one image including 5.1.

In some embodiments, before 1001, that is, before the electronic device detects the input operation, the electronic device may preset an associated image of each type of input operation. For example, for an input operation used to send an image to a contact, the electronic device determines that an associated image of the input operation is a specified image such as an image that has been retouched for a relatively large quantity of times, or for an input operation used to publish an image on a social platform, the electronic device determines that an associated image of the input operation is a specified image such as an image with an extended leg. Therefore, after detecting an input operation, the electronic device determines, based on a preset image associated with the input operation, at least one image associated with the detected input operation.

1004: Display a thumbnail of the at least one image in the image selection interface, and hide another image.

In an example, taking FIG. 3B (b) and FIG. 3B (c) as examples, only a thumbnail of a selected image related to the input operation is displayed in the image selection interface, and a thumbnail of another image is not displayed. For example, if a group of images include three images, and the electronic device selects an image associated with an input operation, only the image is displayed in the image selection interface, and the other two images are not displayed.

Optionally, the electronic device may further display marking information in the image selection interface, where the marking information is used to indicate that the at least one image is related to the input operation. In an example, the electronic device displays the marking information on a thumbnail of each of the at least one image, for example, displays marks on the thumbnail 204 and the thumbnail 206 in FIG. 2A (a) to FIG. 2A (c); or displays the marking information in a region in which the at least one image is not displayed in the image selection interface.

Optionally, the marking information includes one or more of an icon, a text, and an image; or the displaying the marking information on a thumbnail of each of the at least one image includes: highlighting an edge of the thumbnail of each of the at least one image. For example, edges of the thumbnail 306 and the thumbnail 308 in FIG. 3B (a) to FIG. 3B (e) are highlighted.

In a possible case, the electronic device may read or load all images in the group of associated images from the local memory or the cloud storage; determine at least one image related to the input operation from all the images in the group of images; and then display the thumbnail of the at least one image in the image selection interface, and not display a thumbnail of the another image in the image selection interface.

For example, an image is stored in the cloud storage. Taking FIG. 3B (c) as an example, the mobile phone may download all images in a group of associated images from the cloud storage, and display, in the interface 305, only thumbnails of two images related to an input operation. When detecting an operation on a "view more" control, the mobile phone may display a thumbnail of an image other than the two images.

In another possible case, the electronic device may read or load the at least one image associated with the input operation from the local memory or the cloud storage, and display the thumbnail of the at least one image in the image selection interface; and not read or load the image other than the at least one image in the group of images from the local memory or the cloud storage.

For example, an image is stored in the cloud storage. Further taking FIG. 3B (c) as an example, the mobile phone may download only two images related to an input operation from the cloud storage, and then display thumbnails of the two images in the interface 305. When detecting an operation on a "view more" control, the mobile phone may download another image from the cloud storage, and display a thumbnail of the another image.

In other possible cases, the electronic device may alternatively preload only the thumbnail of the at least one image from the local memory or the cloud storage, and not preload a thumbnail of the image other than the at least one image in the group of images; and then display the thumbnail of the at least one image in the image selection interface.

For example, an image is stored in the cloud storage. Further taking FIG. 3B (c) as an example, the mobile phone may preload only thumbnails of two images related to an input operation from the cloud storage, and may not need to fully download original images of the two images (definition of the thumbnail is lower than definition of the original image) or to preload a thumbnail of another image. The mobile phone may display the thumbnails of the two images in the interface 305. When detecting an operation on a "view more" control, the mobile phone may preload the thumbnail of the another image from the cloud storage, and display the thumbnail of the another image.

1005: Detect a first operation, where the first operation is used to select a first thumbnail in the image selection interface.

1006: Perform, on the first thumbnail, a processing procedure corresponding to the input operation.

In some embodiments, the input operation may be an operation used to publish an image. In this case, after selecting the first thumbnail, the electronic device may perform an image publishing procedure on the first thumbnail. Taking a Weibo application as an example, the image publishing procedure may include: The electronic device sends an image to a server corresponding to the Weibo application, to publish the image to a Weibo platform through the server. In other embodiments, the input operation may be an operation used to send an image to a contact. In this case, after selecting the first thumbnail, the electronic device may send an image corresponding to the first thumbnail to the contact.

In the foregoing embodiments provided in this application, the method provided in the embodiments of this application is described from a perspective that the electronic device (the mobile phone 100) serves as an execution subject. To implement functions in the method provided in the embodiments of this application, the terminal device may include a hardware structure and/or a software module, and implement the functions in a form of the hardware structure, the software module, or both the hardware structure and the software module. Whether a specific function of the foregoing functions is performed by using the hardware structure, the software module, or the combination of the hardware structure and the software module depends on a particular application and a design constraint of the technical solution.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing description is described with reference to a specific embodiment. However, the foregoing example discussion is not intended to be detailed, and is not intended to limit this application to a disclosed precise form. Based on the foregoing teaching content, many modification forms and variation forms are possible. Embodiments are selected and described to fully illustrate the principles of this application and practical application of the principles, so that other persons skilled in the art can make full use of this application and various embodiments that have various modifications applicable to conceived specific usage.

What is claimed is:

1. A method, wherein the method comprises:
    associating a group of images based on at least one of photographed objects, photographing times, or photographing places;
    detecting operation behaviors on the group of associated images, wherein detecting the operation behaviors comprises identifying which one or more operations were performed on one or more of the associated images, and wherein the one or more operations comprise of deleting, viewing, sharing, collecting, editing, retaining, retouching, publishing, or sending the images;
    classifying the associated images in the group based on the operation behaviors;
    detecting an input operation associated with an application;
    displaying, in response to the input operation, an image selection interface of the application on a display of an electronic device;
    selecting, from the group of associated images, at least one first image that has, based on classifying the associated images, an operation behavior matched to the input operation, wherein the matched operation behavior is one of the one or more operations;
    displaying a first thumbnail of the first image in the image selection interface, wherein the first thumbnail is marked to identify the operation behavior;
    detecting a first operation of selecting the first thumbnail in the image selection interface; and
    performing, on the first thumbnail, a processing procedure corresponding to the input operation.

2. The method of claim 1, further comprising hiding a second image other than the at least one first image in the group of associated images.

3. The method of claim 1, further comprising displaying marking information indicating that the at least one first image is related to the input operation.

4. The method of claim 3, further comprising:
    displaying the marking information on the first thumbnail; or
    displaying the marking information in a region in which the at least one first image is not displayed in the image selection interface.

5. The method of claim 3, wherein the marking information comprises one or more of an icon, a text, or a second image, or wherein the method further comprises highlighting an edge of the first thumbnail.

6. The method of claim 1, wherein the group of associated images comprises a first group of images comprising a same photographed object, a second group of images with a photographing time difference that is less than a preset time difference, a third group of images photographed at a same place, a fourth group of images belonging to a same album, a fifth group of images comprising same content but having different resolution, or a sixth group of images obtained after a same image is retouched in different manners.

7. The method of claim 1, wherein before detecting the input operation, the method further comprises presetting, in a local memory or a cloud storage, an associated image of each type of input operation.

8. The method of claim 1, further comprising:
performing an image publishing procedure on a second image corresponding to a second thumbnail when the input operation is publishing an image; and
sending the second image to a contact when the input operation is sending the image to the contact.

9. The method of claim 1, further comprising:
identifying an operation type of the input operation; and
obtaining, based on the operation type, at least one second image associated with the operation type.

10. The method of claim 9, further comprising:
identifying that the input operation is publishing an image; and
obtaining, based on the operation type, at least one third image suitable to be published.

11. The method of claim 9, further comprising:
identifying that the input operation is communicating with a contact; and
obtaining, based on the operation type, at least one third image suitable to be sent to the contact.

12. The method of claim 10, wherein the at least one third image comprises:
a fourth image of a same type as a fifth image that has been published; or
at least one sixth image that has been retouched for a preset quantity of times.

13. The method of claim 11, wherein the at least one third image comprises:
a fourth image comprising the contact; or
a fifth image of a same type as a sixth image that has been sent to the contact.

14. The method of claim 1, further comprising:
obtaining related information of the application to which the input operation relates; and
obtaining, based on the related information, at least one second image associated with the related information.

15. The method of claim 14, further comprising:
identifying a type of the application or a function of the application; and
obtaining, based on the type or the function, at least one third image matching the type or the function.

16. The method of claim 14, further comprising:
obtaining a historical record of publishing or sharing a third image by the application; and
obtaining, based on the historical record, at least one fourth image matching the historical record.

17. The method of claim 1, further comprising:
obtaining time information corresponding to the input operation; and
obtaining, based on the time information, at least one second image matching the time information.

18. The method of claim 1, further comprising:
reading or loading second images in the group of associated images from a local memory or a cloud storage;
obtaining the at least one first image from all the second images;
displaying the first thumbnail; and
skipping displaying a second thumbnail of a third image in the image selection interface.

19. An electronic device comprising:
a display;
a memory coupled to the display and configured to store instructions; and
a processor coupled to the display and the memory, wherein when executed by the processor, the instructions cause the electronic device to:
associate a group of images based on at least one of photographed objects, photographing times, or photographing places;
detect operation behaviors on the group of associated images, wherein detecting the operation behaviors comprises identifying which one or more operations were performed on one or more of the associated images, and wherein the one or more operations comprise deleting, viewing, sharing, collecting, editing, retaining, retouching, publishing, or sending the images;
classify the associated images in the group based on the operation behaviors;
detect an input operation associated with an application;
display, in response to the input operation, an image selection interface of the application on the display;
select, from the group of associated images, at least one first image that has, based on classifying the associated images, an operation behavior matched to the input operation, wherein the matched operation behavior is one of the one or more operations;
display a first thumbnail of the first image in the image selection interface, wherein the first thumbnail is marked to identify the operation behavior;
detect a first operation of selecting the first thumbnail in the image selection interface; and
perform, on the first thumbnail, a processing procedure corresponding to the input operation.

20. A computer program product comprising computer-executable instructions that are stored on a non-transitory computer-readable medium and that, when executed by a processor, cause an electronic device to:
associate a group of images based on at least one of photographed objects, photographing times, or photographing places;
detect operation behaviors on the group of associated images, wherein detecting the operation behaviors comprises identifying which one or more operations were performed on one or more of the associated images, and wherein the one or more operations comprise deleting, viewing, sharing, collecting, editing, retaining, retouching, publishing, or sending the images;
classify the associated images in the group based on the operation behaviors;
detect an input operation associated with an application;
display, in response to the input operation, an image selection interface of the application on a display of the electronic device;
select, from the group of associated images, at least one first image that has, based on classifying the associated images, an operation behavior matched to the input operation, wherein the matched operation behavior is one of the one or more operations;
display a first thumbnail of the first image in the image selection interface, wherein the first thumbnail is marked to identify the operation behavior;
detect a first operation of selecting the first thumbnail in the image selection interface; and
perform, on the first thumbnail, a processing procedure corresponding to the input operation.

* * * * *